US012255713B2

(12) United States Patent
Hao et al.

(10) Patent No.: US 12,255,713 B2
(45) Date of Patent: Mar. 18, 2025

(54) CSI MAPPING AND OMISSION WITH TD COMPRESSION

(71) Applicant: QUALCOMM Incorporated, San Diego, CA (US)

(72) Inventors: Chenxi Hao, Beijing (CN); Yu Zhang, San Diego, CA (US); Alexandros Manolakos, Escondido, CA (US); Joseph Binamira Soriaga, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/632,329

(22) PCT Filed: Aug. 23, 2019

(86) PCT No.: PCT/CN2019/102267
§ 371 (c)(1),
(2) Date: Feb. 2, 2022

(87) PCT Pub. No.: WO2021/035396
PCT Pub. Date: Mar. 4, 2021

(65) Prior Publication Data
US 2022/0302979 A1    Sep. 22, 2022

(51) Int. Cl.
*H04B 7/06*    (2006.01)
*H04L 5/00*    (2006.01)
*H04W 24/08*    (2009.01)

(52) U.S. Cl.
CPC ......... *H04B 7/0626* (2013.01); *H04L 5/0051* (2013.01); *H04W 24/08* (2013.01)

(58) Field of Classification Search
CPC ..... H04B 7/0626; H04B 7/048; H04L 5/0051; H04L 5/0023; H04L 5/0057; H04W 24/08
See application file for complete search history.

(56) References Cited

U.S. PATENT DOCUMENTS

2012/0257579 A1   10/2012   Li et al.
2013/0201912 A1   8/2013    Sheng et al.
(Continued)

FOREIGN PATENT DOCUMENTS

CN    103297202 A      9/2013
WO    2018058600 A1    4/2018

OTHER PUBLICATIONS

AT&T, CSI Decomposition Results and Impact on Codebook Design (Year: 2018).*
(Continued)

*Primary Examiner* — Ayanah S George
(74) *Attorney, Agent, or Firm* — QUALCOMM Incorporated

(57) ABSTRACT

Certain aspects of the present disclosure provide techniques for channel state information (CSI) reporting with time domain (TD) compression. A method that may be performed by a user equipment (UE) includes receiving one or more CSI-RS from a base station (BS). The UE measures the one or more CSI-RS. The UE determining a mapping order for placing CSI feedback in one or more CSI reports and sends the one or more CSI reports to the BS based on the measurements, the one or more CSI reports providing TD compressed CSI feedback including at least linear combination coefficients associated with TD bases used for the TD compression.

35 Claims, 25 Drawing Sheets

(56) References Cited

U.S. PATENT DOCUMENTS

| | | | | |
|---|---|---|---|---|
| 2015/0036529 A1* | 2/2015 | Zhang | .................. | H04L 1/0026 370/252 |
| 2015/0180684 A1* | 6/2015 | Chen | .................. | H04B 7/0617 370/252 |
| 2021/0099210 A1* | 4/2021 | Ramireddy | .......... | H04B 7/0626 |

OTHER PUBLICATIONS

AT&T: "CSI Decomposition Results and Impact on Codebook Design", 3GPP TSG RAN WG1 Meeting #88, R1-1702269, CSI Decomposition Results and Impact on Codebook Design, 3rd Generation Partnership Project (3GPP), Mobile Competence Centre, 650, Route Des Lucioles, F-06921 Sophia-Antipolis Cedex, France, vol. RAN WG1. No. Athens, Greece, Feb. 13, 2017-Feb. 17, 2017, Feb. 12, 2017, XP051209424, 5 Pages, Section 4, par 2, figure 2, Section 1, Cat. 2.

Supplementary European Search Report—EP19943230—Search Authority—The Hague—May 2, 2023.

International Search Report and Written Opinion—PCT/CN2019/102267—ISA/EPO—Apr. 26, 2020.

LG Electronics: "Discussions on Overhead Reduction for Type II Codebook", 3GPP TSG RAN WG1 Meeting #95, R1-1813916, Nov. 16, 2018 (Nov. 16, 2018) the whole document, 8 pages.

\* cited by examiner

CSI MAPPING AND OMISSION WITH TD COMPRESSION

CROSS-REFERENCE TO RELATED APPLICATIONS

This application is a national stage application under 35 U.S.C. 371 of PCT/CN2019/102267, filed Aug. 23, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for channel state information (CSI) reporting with time domain (TD) compression.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include channel state information (CSI) reporting, including CSI mapping and omission, with time domain (TD) compression.

Certain aspects provide a method for wireless communication by a user equipment (UE). The method generally includes receiving one or more channel state information reference signals (CSI-RS) from a base station (BS). The method generally includes measuring the one or more CSI-RS. The method generally includes determining a mapping order for placing CSI feedback in one or more CSI reports. The method generally includes sending the one or more CSI reports to the BS based on the measurements, the one or more CSI reports providing time domain (TD) compressed CSI feedback including at least linear combination coefficients associated with TD bases used for the TD compression.

Certain aspects provide a method for wireless communication by a BS. The method generally includes transmitting one or more CSI-RS to a UE. The method generally includes receiving one or more CSI reports from the UE, the one or more CSI reports providing TD compressed CSI feedback including at least linear combination coefficients associated with TD bases used for the TD compression.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for channel state information (CSI) reporting with time domain (TD) compression.

The following description provides examples of CSI reporting with TD compression in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
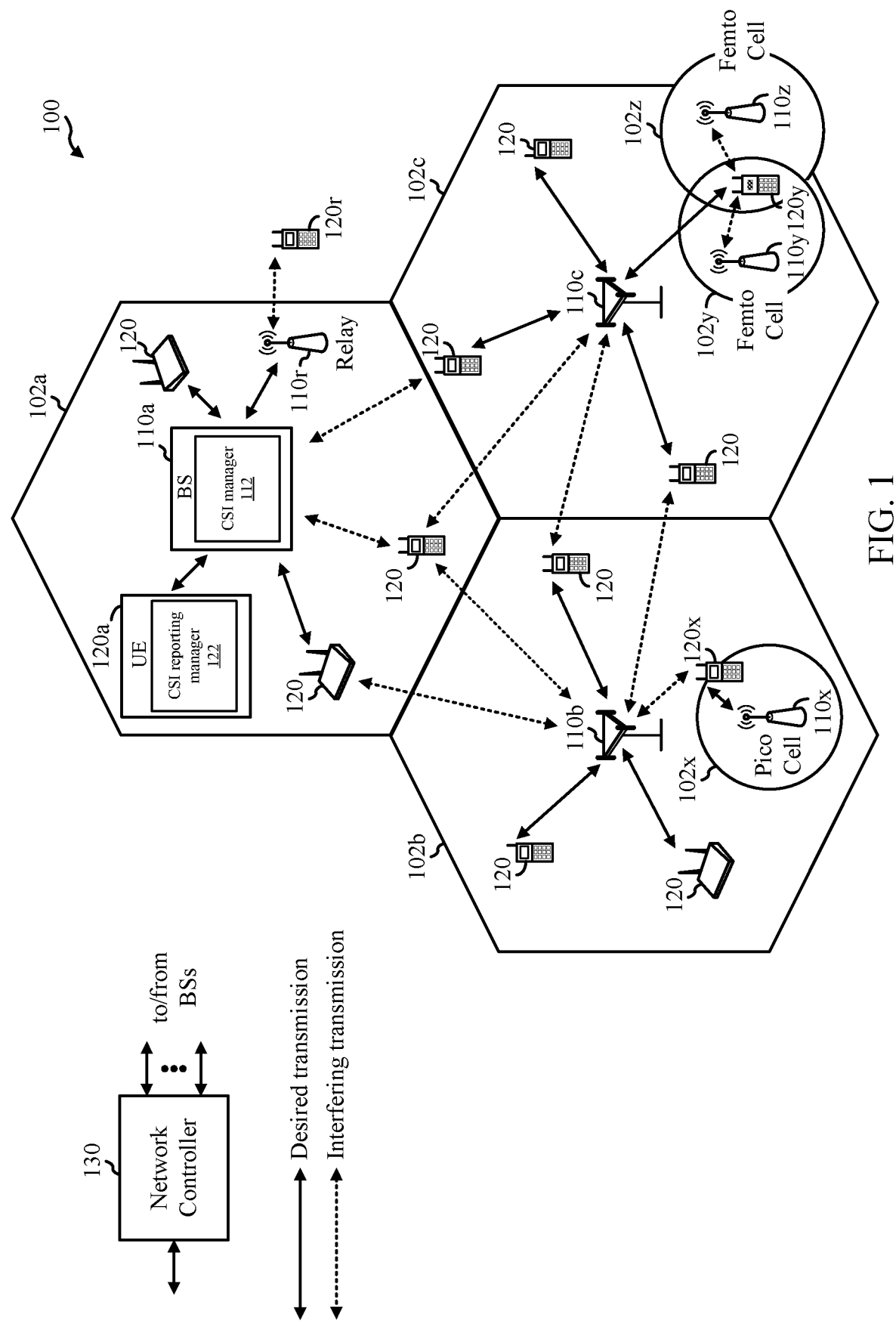
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for CSI reporting with TD compression. As shown in FIG. 1, the BS 110a includes a CSI manager 112. The CSI manager 112 may be configured for CSI reporting with TD compression, in accordance with aspects of the present disclosure. As shown in FIG. 1, the UE 120a includes a CSI reporting manager 122. The CSI reporting manager 122 may be configured for CSI reporting with TD compression, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
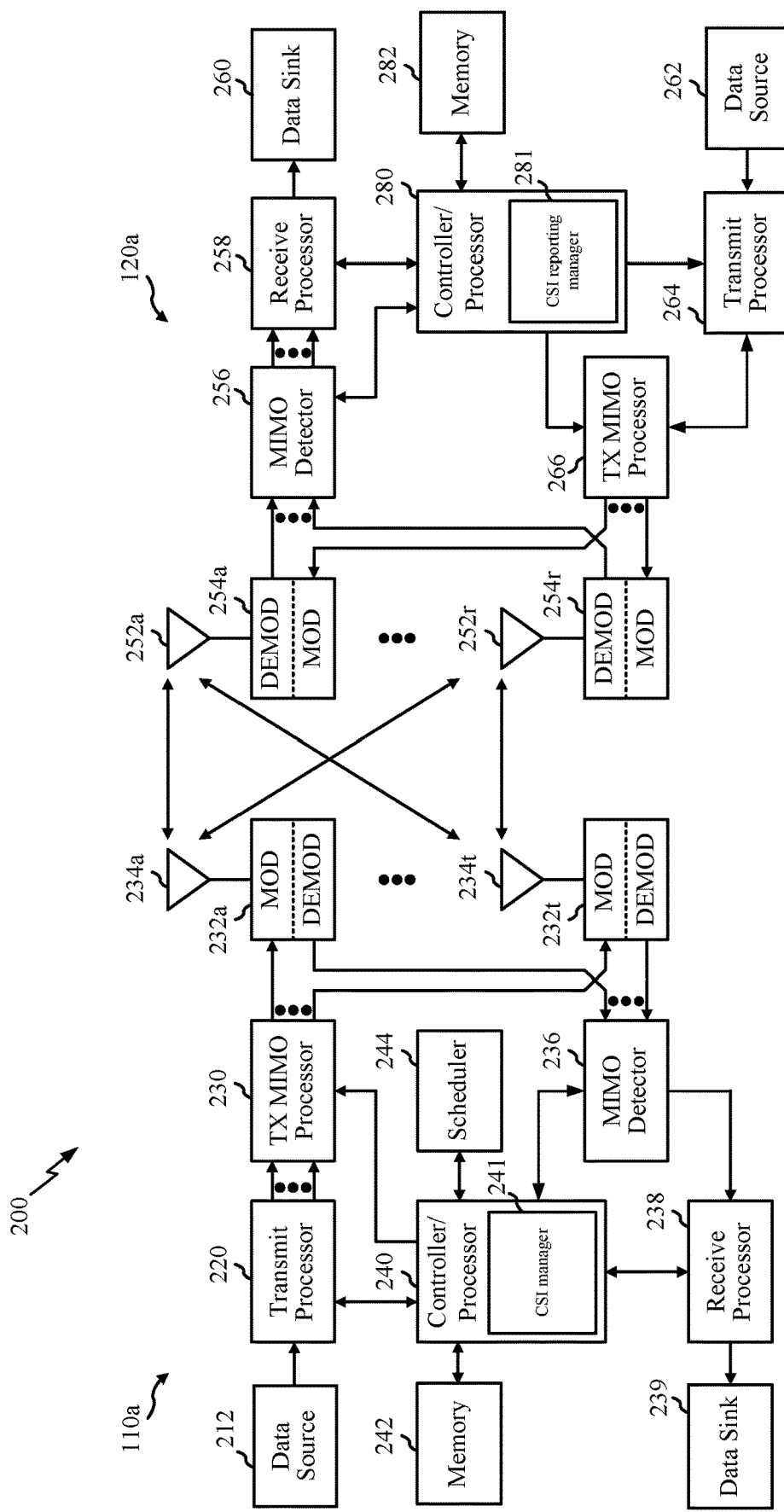
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a CSI manager 241 that may be configured for CSI reporting with TD compression, according to aspects described herein. As shown in FIG. 2, the controller/processor 280 of the UE 120a has a CSI reporting manager 281 that may be configured for CSI reporting with TD compression, according to aspects described herein. Although shown at the Controller/Processor, other components of the UE 120a and BS 110a may be used performing the operations described herein.

Example CSI Configuration

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

A UE (e.g., such as a UE 120a) may be configured by a BS (e.g., such as a BS 110) for CSI reporting. The BS may configure the UE with a CSI reporting configuration or with multiple CSI report configurations. The BS may provide the CSI reporting configuration to the UE via higher layer signaling, such as radio resource control (RRC) signaling (e.g., via a CSI-ReportConfig information element (IE)).

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

The CSI report configuration may configure the time and frequency resources used by the UE to report CSI. For example, the CSI report configuration may be associated with CSI-RS resources for channel measurement (CM), interference measurement (IM), or both. The CSI report configuration may configure CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM. For interference measurement, it can be NZP CSI-RS or zero power CSI-RS, which is known as CSI-IM (note, if NZP CSI-RS, it is called NZP CSI-RS for interference measurement, if zero power, it is called CSI-IM)

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource. The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

The CSI report configuration can also configure the CSI parameters (sometimes referred to as quantities) to be reported. Codebooks may include Type I single panel, Type I multi-panel, and Type II single panel. Regardless which codebook is used, the CSI report may include at least the channel quality indicator (CQI), precoding matrix indicator (PMI), CSI-RS resource indicator (CRI), and rank indicator (RI). The structure of the PMI may vary based on the codebook. The CRI, RI, and CQI may be in a first part (Part I) and the PMI may be in a second part (Part II) of the CSI report.

For the Type I single panel codebook, the PMI may include a W1 matrix (e.g., subset of beams) and a W2 matrix (e.g., phase for cross polarization combination and beam selection). For the Type I multi-panel codebook, compared to type I single panel codebook, the PMI further comprises a phase for cross panel combination. The BS may have a plurality of transmit (TX) beams. The UE can feed back to the BS an index of a preferred beam, or beams, of the candidate beams. For example, the UE may feed back the precoding vector w for the l-th layer:

$$w_l = \begin{pmatrix} b_{+45pol} \\ \varphi \cdot b_{-45pol} \end{pmatrix},$$

where b represents the oversampled beam (e.g., discrete Fourier transform (DFT) beam), for both polarizations, and φ is the co-phasing.

For the Type II codebook (e.g., which may be designed for single panel), the PMI is a linear combination of beams; it has a subset of orthogonal beams to be used for linear combination and has per layer, per polarization, amplitude and phase for each beam. The preferred precoder for a layer can be a combination of beams and associated quantized coefficients, and the UE can feedback the selected beams and the coefficients to the BS.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Example CSI with SD Compression

In certain systems (e.g., Release 15 5G NR), the UE may be configured to report at least a Type II precoder across configured frequency domain (FD) units. The UE may report wideband (WB) PMI and/or subband (SB) PMI as configured.

For a layer l, its precoder across $N_3$ FD units (also referred to as PMI subbands) may be given by a size-$N_t \times N_3$ matrix $W_l$ as follows:

$$W_l = W_1 \times W_{2,l},$$

where $W_1$ and $W_{2,l}$ are as described in the following table:

| Notation | size | description | Comment |
|---|---|---|---|
| $W_1$ | $N_t \times 2L$ | SD basis; same SD bases are applied to both polarizations | Layer-common |
| $W_{2,l}$ | $2L \times N_3$ | Coefficient matrix: | Layer-specific; |

Note:
L value is rank-common and layer-common

These two matrices can be written as:

$$W_1 = \begin{bmatrix} v_{m_1^{(0)},m_2^{(0)}}, v_{m_1^{(1)},m_2^{(1)}}, \ldots, v_{m_1^{(L-1)},m_2^{(L-1)}} & 0 \\ 0 & v_{m_1^{(0)},m_2^{(0)}}, v_{m_1^{(1)},m_2^{(1)}}, \ldots, v_{m_1^{(L-1)},m_2^{(L-1)}} \end{bmatrix}$$

where the SD bases are DFT based and the SD basis with index $m_1^{(i)}$ and $m_2^{(i)}$ is written as $$v_{m_1^{(i)},m_2^{(i)}} = \left[ u_{m_2^{(i)}} \quad e^{\frac{j2\pi m_1^{(i)}}{O_1 N_1}} u_{m_2^{(i)}} \quad \ldots \quad e^{\frac{j2\pi m_1^{(i)}(N_1-1)}{O_1 N_1}} u_{m_2^{(i)}} \right]^T,$$

$$u_{m_2^{(i)}} = \left[ 1 \quad e^{\frac{j2\pi m_2^{(i)}}{O_2 N_2}} \quad \ldots \quad e^{\frac{j2\pi m_2^{(i)}(N_2-1)}{O_2 N_2}} \right]$$

The coefficient matrix may be written as $$W_{2,l} = \begin{bmatrix} p_{0,l,0}^{(1)} p_{0,l,0}^{(2)} e^{j\phi_{0,l,0}} & p_{0,l,1}^{(1)} p_{0,l,1}^{(2)} e^{j\phi_{0,l,1}} & \ldots & p_{0,l,M-1}^{(1)} p_{0,l,M-1}^{(2)} e^{j\phi_{0,l,M-1}} \\ p_{1,l,0}^{(1)} p_{1,l,0}^{(2)} e^{j\phi_{1,l,0}} & p_{1,l,1}^{(1)} p_{1,l,1}^{(2)} e^{j\phi_{0,l,1}} & \ldots & p_{1,l,M-1}^{(1)} p_{1,l,M-1}^{(2)} e^{j\phi_{1,l,M-1}} \\ \vdots & \vdots & \ddots & \vdots \\ p_{L-1,l,0}^{(1)} p_{L-1,l,0}^{(2)} e^{j\phi_{L-1,l,0}} & p_{L-1,l,1}^{(1)} p_{L-1,l,1}^{(2)} e^{j\phi_{L-1,l,1}} & \ldots & p_{L-1,l,M-1}^{(1)} p_{L-1,l,M-1}^{(2)} e^{j\phi_{L-1,l,M-1}} \\ p_{L,l,0}^{(1)} p_{L,l,0}^{(2)} e^{j\phi_{L,l,0}} & p_{L,l,1}^{(1)} p_{L,l,1}^{(2)} e^{j\phi_{L,l,1}} & \ldots & p_{L,l,M-1}^{(1)} p_{L,l,M-1}^{(2)} e^{j\phi_{L,l,M-1}} \\ p_{L+1,l,0}^{(1)} p_{L+1,l,0}^{(2)} e^{j\phi_{L+1,l,0}} & p_{L+1,l,1}^{(1)} p_{L+1,l,1}^{(2)} e^{j\phi_{L+1,l,1}} & \ldots & p_{L+1,l,M-1}^{(1)} p_{L+1,l,M-1}^{(2)} e^{j\phi_{L+1,l,M-1}} \\ \vdots & \vdots & \ddots & \vdots \\ p_{2L-1,l,0}^{(1)} p_{2L-1,l,0}^{(2)} e^{j\phi_{2L-1,l,0}} & p_{2L-1,l,1}^{(1)} p_{2L-1,l,1}^{(2)} e^{j\phi_{2L-1,l,1}} & \ldots & p_{2L-1,l,M-1}^{(1)} p_{2L-1,l,M-1}^{(2)} e^{j\phi_{2L-1,l,M-1}} \end{bmatrix}$$

In some cases, a common (P1) value may apply to all $p_{i,m,l}^{(1)}$ coefficients (or simply P1 coefficients) in one row. In such cases, given 2L rows in the matrix, the P1 value is row-specific and there might be 2L different values for these coefficients.

The coefficients $p_{i,m,l}^{(1)}$, $p_{i,m,l}^{(2)}$ and $\varphi_{i,m,l}$ are described as follows:

| Notation | description | Alphabet |
|---|---|---|
| $p_{i,m,l}^{(1)}$ | Reference amplitude for beam i of the 1$^{st}$ polarization. $p_{i,m,l}^{(1)} = p_{i',m',l}^{(1)} \forall i' \neq i, m' \neq m$ | $\{1, \sqrt{1/2}, \sqrt{1/4}, \sqrt{1/8}, \sqrt{1/16}, \sqrt{1/32}, \sqrt{1/64}, 0\}$ |
| $p_{i+L,m,l}^{(1)}$ | Reference amplitude for the 2$^{nd}$ polarization. $p_{i+L,m,l}^{(1)} = p_{i'+L,m',l}^{(1)}$ $\forall i' \neq i, m' \neq m$ | $\{1, \sqrt{1/2}, \sqrt{1/4}, \sqrt{1/8}, \sqrt{1/16}, \sqrt{1/32}, \sqrt{1/64}, 0\}$ |
| $p_{i,m,l}^{(2)}$ and $p_{i+L,m,l}^{(2)}$ | Differential amplitude for each individual coefficient | $\{1, \sqrt{0.5}\}$ |
| $\varphi_{i,m,l}$ and $\varphi_{i+L,m,l}$ | Phase of each individual coefficient | N-PSK, N = 4 or 8 |

More precisely, the linear combination representation may be written as:

$$W_l = \begin{pmatrix} \sum_{i=0}^{L-1} v_{m_1^{(i)},m_2^{(i)}} p_{i,m,l}^{(1)} p_{i,m,l}^{(2)} \varphi_{i,m,l} \\ \sum_{i=0}^{L-1} v_{m_1^{(i)},m_2^{(i)}} p_{i,m,l}^{(1)} p_{i,m,l}^{(2)} \varphi_{i,m,l} \end{pmatrix}$$

For linear combination of spatial beams B, the UE may report the linear combination coefficients $x_{i,k}^{(l)}$ for each layer l and each subband i, according to the precoding vector w:

$$W_i^{(l)} = \begin{pmatrix} B & 0 \\ 0 & B \end{pmatrix} \times x_i^{(l)} = \begin{pmatrix} \sum_{k=0}^{L-1} b_k \cdot x_{i,k}^{(l)} \\ \sum_{k=0}^{L-1} b_k \cdot x_{i+L,k}^{(l)} \end{pmatrix}$$

Figure 3:
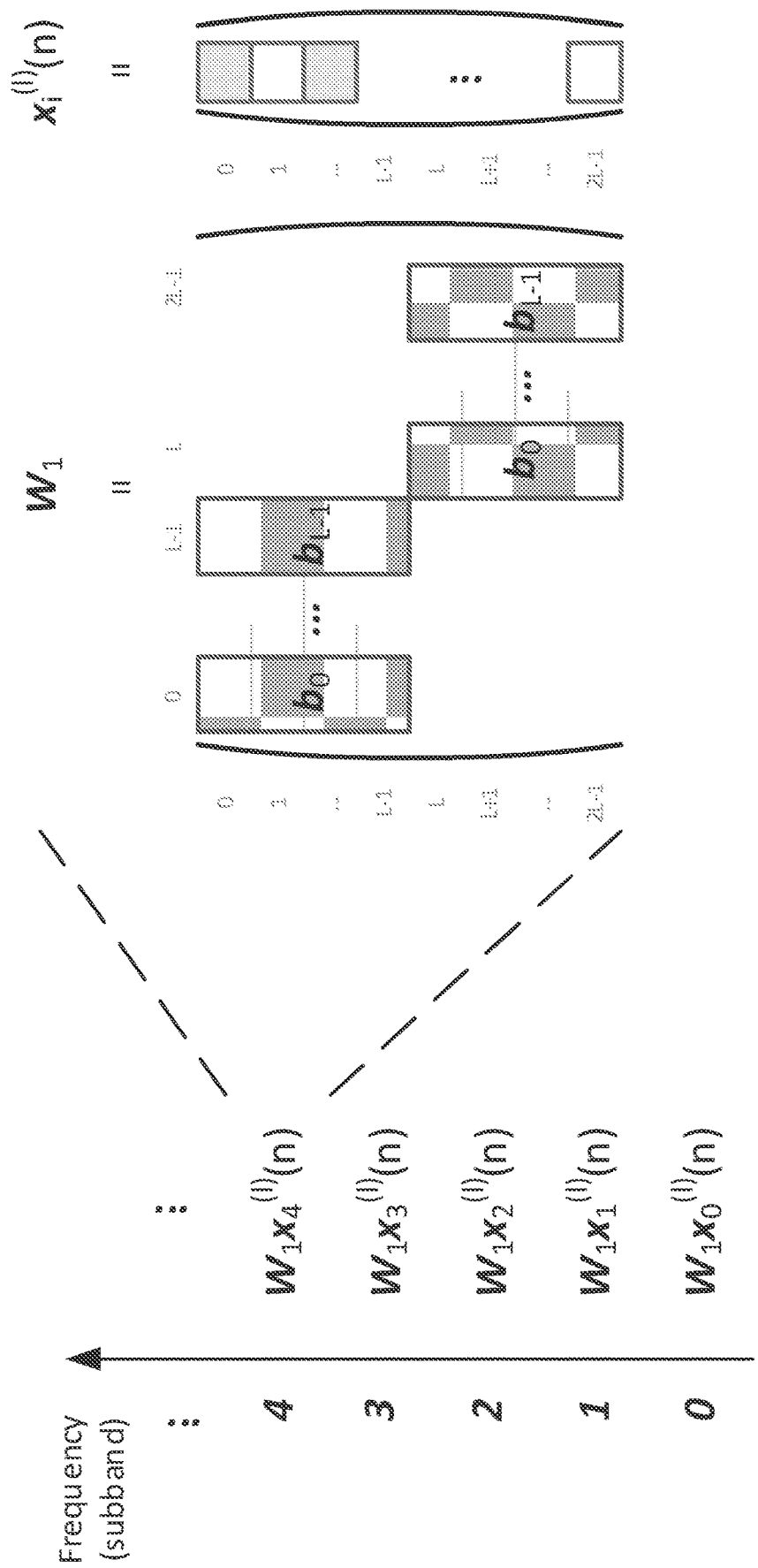
FIG. 3 is a diagram showing example precoder matrix feedback with spatial domain (SD) compression, in accordance with certain aspects of the present disclosure.

The precoder matrix W is based on the spatial domain (SD) compression of a matrix $W_1$ matrix and the $W_2$ matrix for reporting (for cross-polarization) the linear combination coefficients for the selected beams (2L) across the configured FD units, as shown in FIG. 3.

Figure 4:
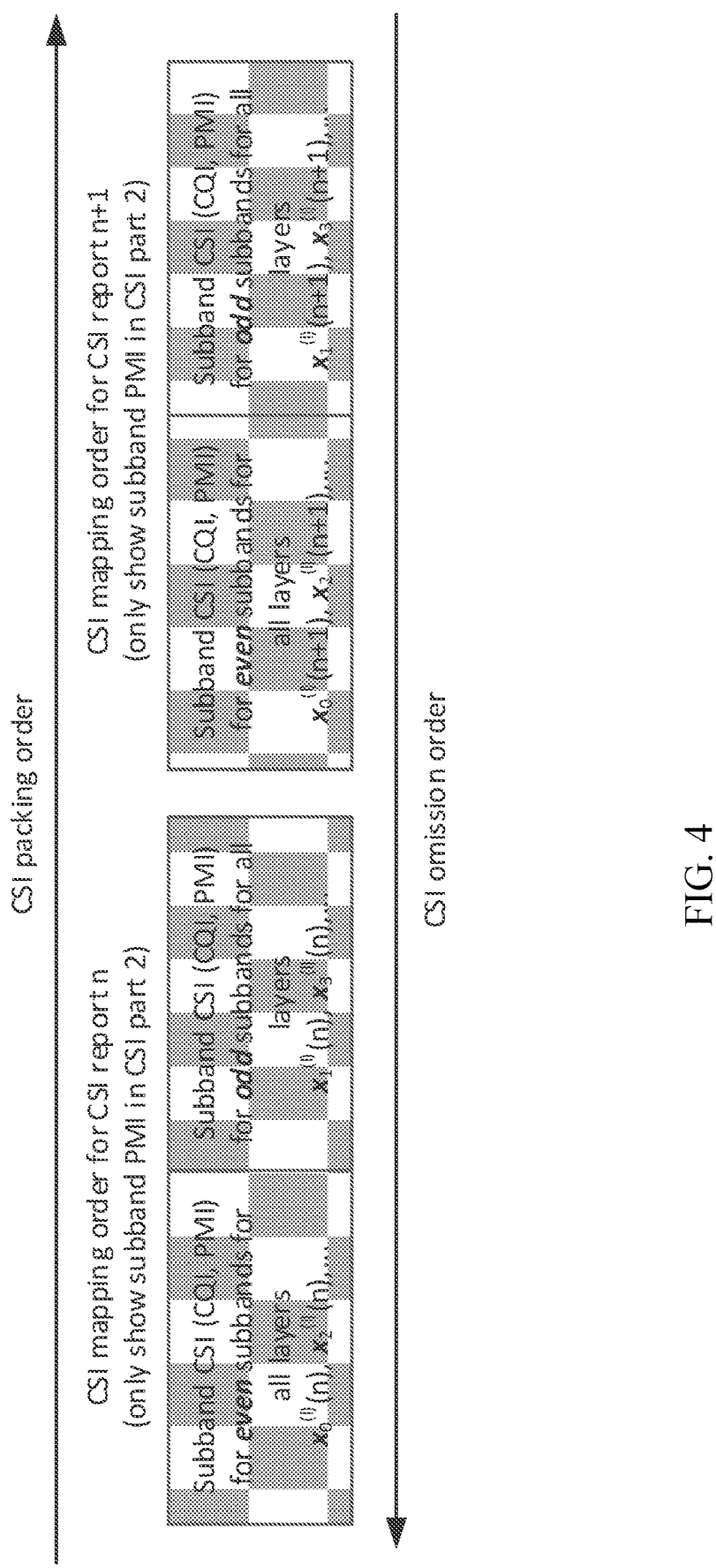
FIG. 4 is a diagram showing example CSI mapping order and omission order for the precoder matrix feedback with SD compression, in accordance with certain aspects of the present disclosure.
Figure 5:
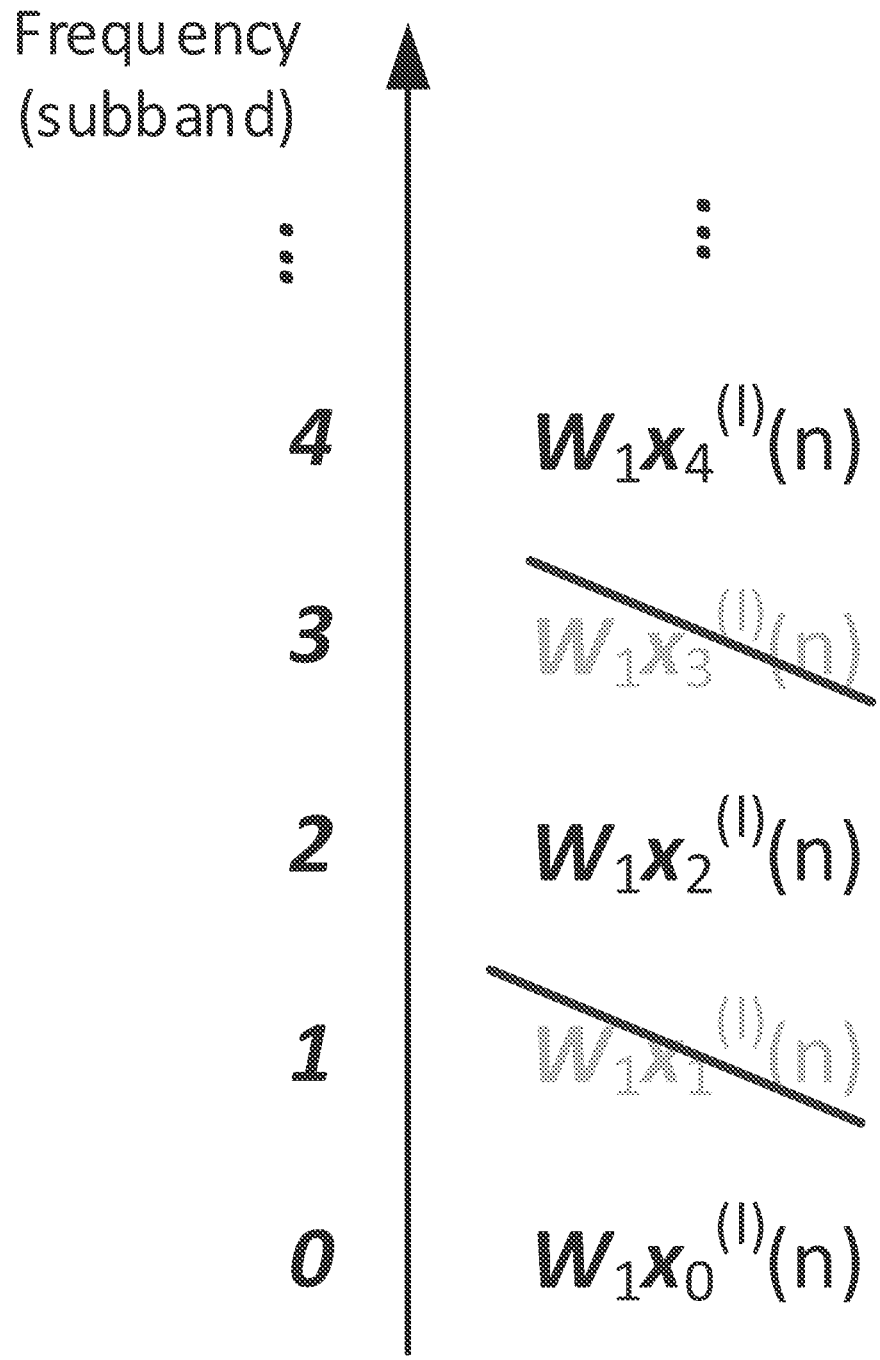
FIG. 5 is a diagram showing example omission of the precoder matrix feedback with SD compression, in accordance with certain aspects of the present disclosure.

FIG. 4 and FIG. 5 show example CSI mapping order and omission order for the precoder matrix feedback with SD compression, in accordance with certain aspects of the present disclosure. As shown in FIG. 4, the CSI (shown only for the subband PMI part) can be packed into the report in order of first reporting the CSI for even subbands for all layers, followed by odd subbands for a layer. As shown in FIG. 4 and FIG. 5, if the UE needs to omit some CSI, it can do so in reverse order of the packing order and will result in first omitting the odd subbands, before omitting the even subbands.

Example CSI with SD and FD Compression

In certain systems (e.g., Rel-16 5G NR), the UE may be configured to report FD compressed precoder feedback to reduce overhead of the CSI report. With codebook operation with FD compression, for a layer 1, its precoder across $N_3$ FD units (e.g., PMI subbands) is given by a size-$N_t \times N_3$ matrix $W_l$ as follows:

$$W_l = W_1 \times \tilde{W}_{2,l} \times W_{f,l}^H,$$

where $W_1$, $\tilde{W}_2$ and $W_f$ are as follows:

| Notation | size | description | Comment |
|---|---|---|---|
| $W_1$ | $N_t \times 2L$ | SD basis; same SD bases are applied to both polarizations | Layer-common |

| Notation | size | description | Comment |
|---|---|---|---|
| $\bar{w}_{2,l}$ | $2L \times M$ | Coefficient matrix: Consist of max $K_0$ NZC per-layer; Consist of max $2K_0$ NZC across all layers | Layer-specific; |
| $W_{f,l}$ | $M \times N_3$ | FD basis; same M FD bases are applied to both polarizations | Layer-specific; |

Note:
L value is rank-common and layer-common
M value is rank-group specific and layer-common. $M = M_{1,2}$ for RI = {1, 2} and $M = M_{3,4} \leq M_{1,2}$ for RI = {3, 4}

Figure 6:
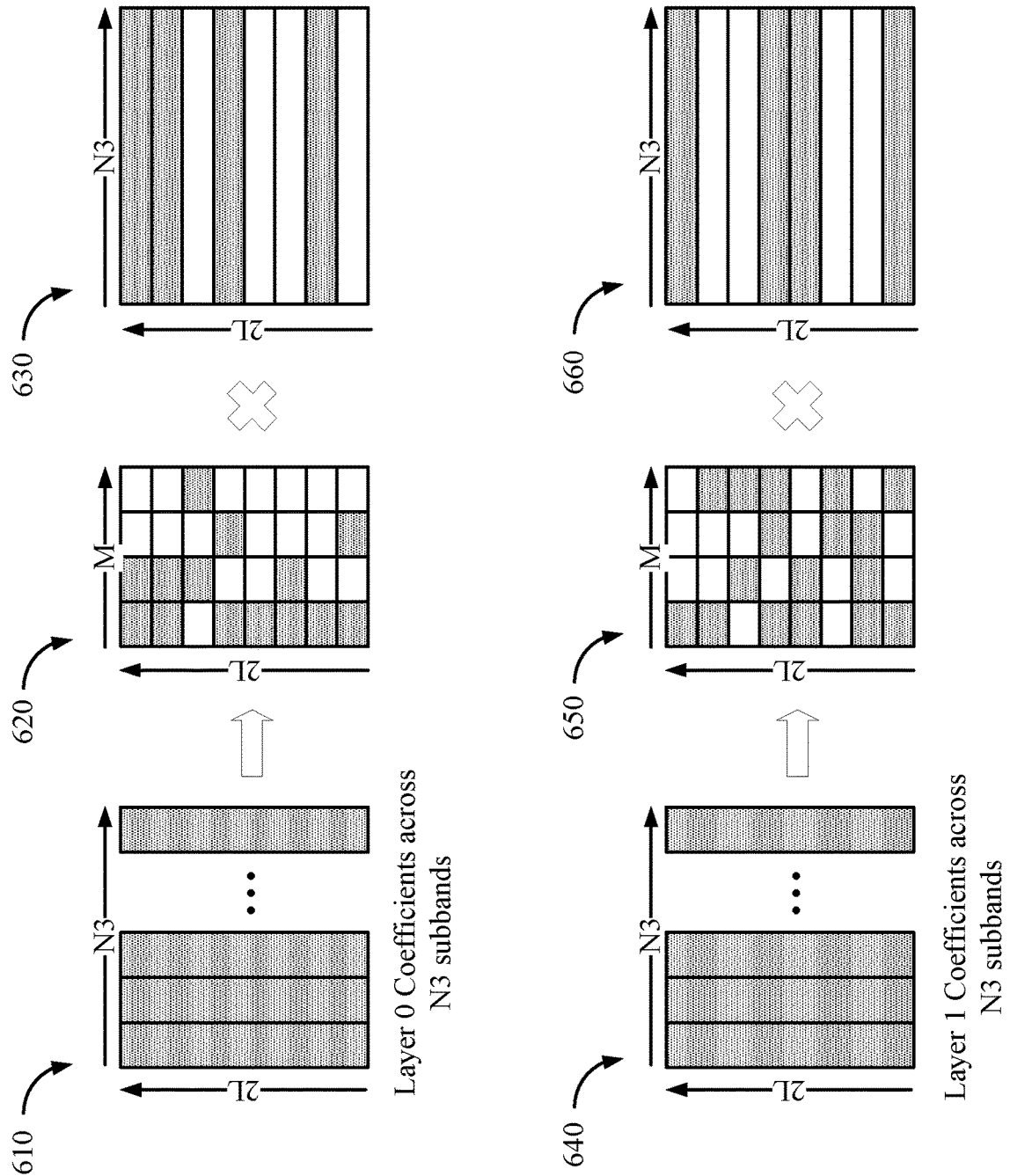
FIG. 6 is a diagram showing example precoder matrix feedback with SD and frequency domain (FD) compression for multiple layers, in accordance with certain aspects of the present disclosure.

As shown in FIG. 6, the precoder matrix ($W_{2,i}$) for layer i with i=0,1 may use an FD compression $W_{f,i}^H$ matrix to compress the precoder matrix into $\bar{w}_{2,i}$ matrix size to 2L×M (where M is network configured and communicated in the CSI configuration message via RRC or DCI, and M<$N_3$) given as:

$$W_i = W_1 \bar{w}_{2,i} W_{f,i}^H$$

Where the precoder matrix $W_i$ (not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\bar{w}_{2,0}$ matrix 620 consists of the linear combination coefficients (amplitude and co-phasing), where each element represents the coefficient of a tap for a beam. The $\bar{w}_{2,0}$ matrix 620 as shown is defined by size 2L×M, where one row corresponds to one spatial beam in $W_1$ (not shown) of size P×2L (where L is network configured via RRC), and one entry therein represents the coefficient of one tap for this spatial beam. The UE may be configured to report (e.g., CSI report) a subset $K_0$<2LM of the linear combination coefficients of the $\bar{w}_{2,0}$ matrix 620. For example, the UE may report $K_{NZ,i}$<$K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\bar{w}_{2,0}$ matrix 620 corresponds to a row of $W_{f,0}^H$ matrix 630. In the example shown, both the $\bar{w}_{2,0}$ matrix 620 at layer 0 and the $\bar{w}_{2,0}$ matrix 550 at layer 1 are 2L×M.

The $W_{f,0}^H$ matrix 630 is composed of the basis vectors (each row is a basis vector) used to perform compression in frequency domain. In the example shown, both the $W_{f,0}^H$ matrix 630 at layer 0 and the $W_{f,1}^H$ matrix 660 at layer 1 include M=4 FD basis (illustrated as shaded rows) from $N_3$ candidate DFT basis. In some configurations, the UE may report a subset of selected basis of the $W_{f,i}^H$ matrix via CSI report. The M bases specifically selected at layer 0 and layer 1. That is, the M bases selected at layer 0 can be same/partially-overlapped/non-overlapped with the M bases selected at layer 1.

Figure 7:
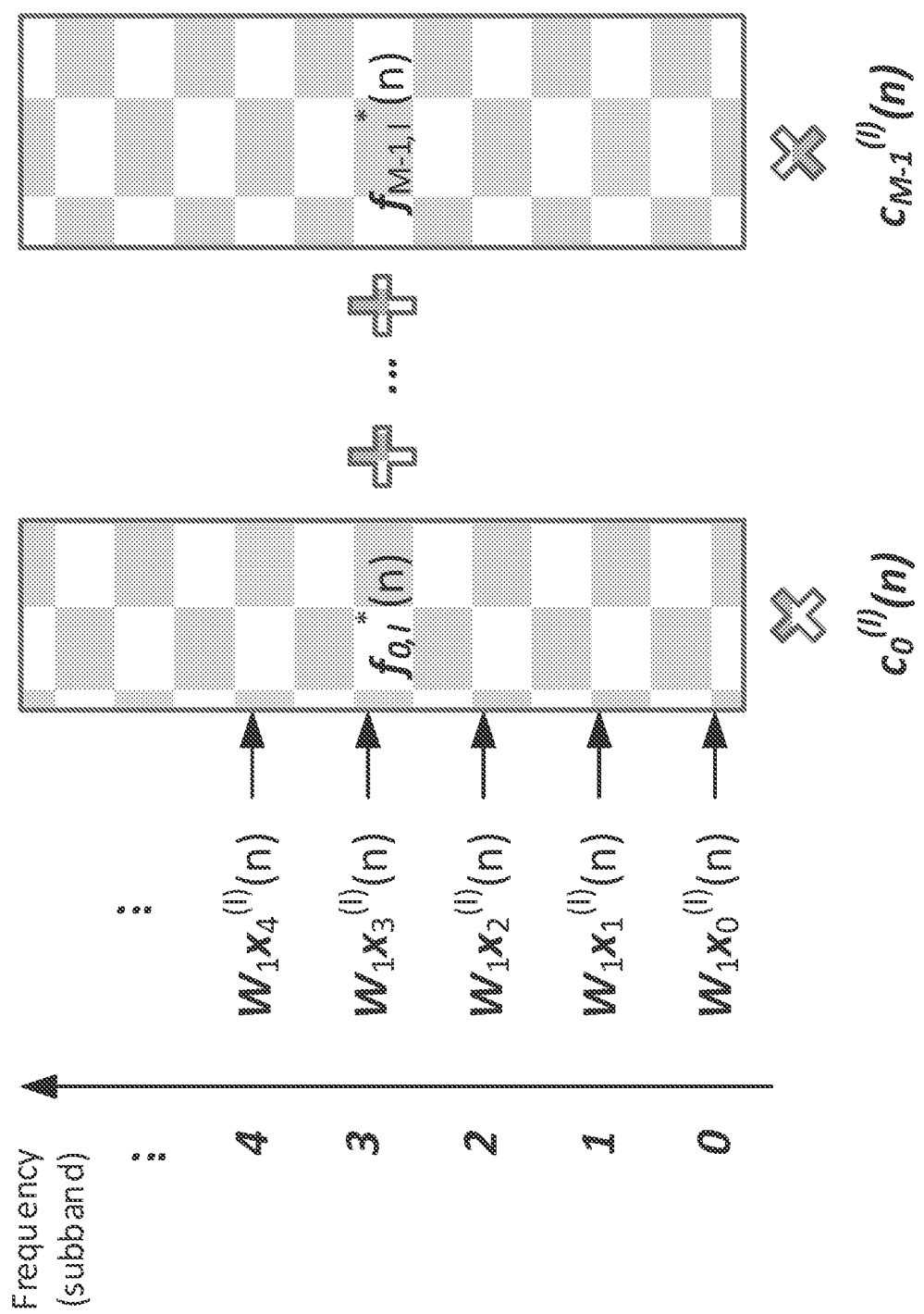
FIG. 7 is a diagram showing example precoder matrix feedback with SD and FD compression, in accordance with certain aspects of the present disclosure.
Figure 8:
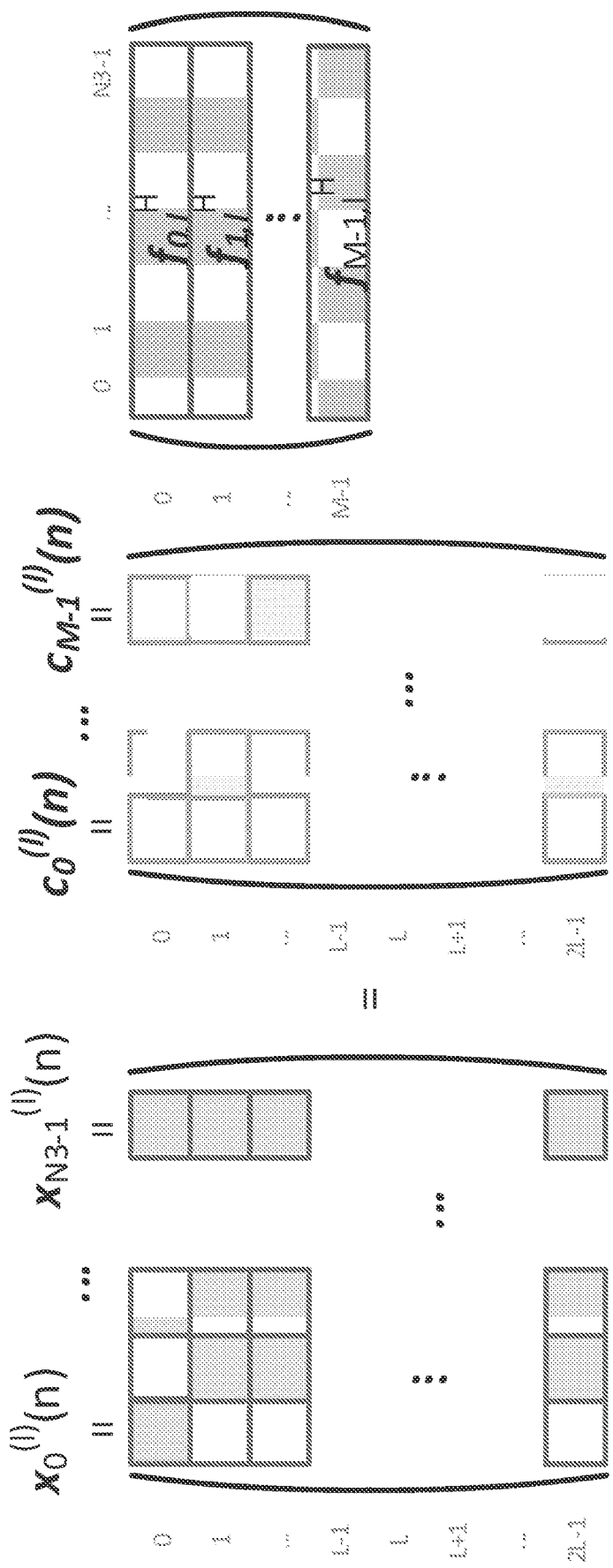
FIG. 8 is a diagram showing example precoder matrix feedback with SD and FD compression, in accordance with certain aspects of the present disclosure.

FIG. 7 and FIG. 8 show FD compression of CSI. The precoder may be written as:

$$W^{(l)} = \begin{pmatrix} \sum_{k=0}^{L-1}\sum_{m=0}^{M-1} b_k \cdot x_{m,k}^{(l)} \cdot f_{m,l}^H \\ \sum_{k=0}^{L-1}\sum_{m=0}^{M-1} b_k \cdot x_{m,k+L}^{(l)} \cdot f_{m,l}^H \end{pmatrix}$$

As discussed above, the Type II CSI with FD compression may compress $N_3$ subbands via M FD bases. The FD bases are selected/reported layer-specific. For each layer, the UE reports a subset of the total 2LM coefficients, where the coefficient selection may be layer specific, and the UE may use a size-2LM bitmap to indicate the selected non-zero coefficients (NZC) and report each the NZC after quantization. In some examples, the UE may report up to $K_0$ coefficients per layer, where $K_{NZ,l} \leq K_0$. In some examples, the UE may report up to $2K_0$ coefficients across all layers, where $\Sigma_{l=0}^{RI-1} K_{NZ,l} \leq 2K_0$. Unreported are set to zeros.

The UE may report the CSI in uplink control information (UCI). In some examples, the CSI is reported in a two-part UCI. In some examples, in the UCI part one the UE may transmit RI, CQI, the number of non-zero coefficients (NNZC). In some examples, in the UCI part two the UE may transmit for the supported layers (e.g., layers 0 to RI-1) the SD beam selection, FD basis selection, coefficient selection, strongest coefficient indication (SCI), and/or coefficient quantization. The SD beam selection may indicate the selected beams (e.g., the subset of 2L beams).

In some examples, the CSI report configuration configures the UE to report a maximum number of coefficients per rank, $K_0$. For example, the UE can select the subset $K_0$<2LM of the linear combination coefficients of the $\bar{w}_2$ matrix for reporting. In some cases; however, the UE may not have sufficient resources for reporting the configured $K_0$ number of coefficients per rank. For example, the UE may be allocated physical uplink shared channel (PUSCH) for the CSI reporting. Based on the amount of PUSCH resources allocated and the resources used for reporting the UCI part one, the remaining resources for reporting the configured $K_0$ number of coefficients per rank dynamic UCI part two. Thus, the UE may omit reporting of some of the CSI. For example, the UE may omit according to configured CSI priority/omission rules.

Figure 9:
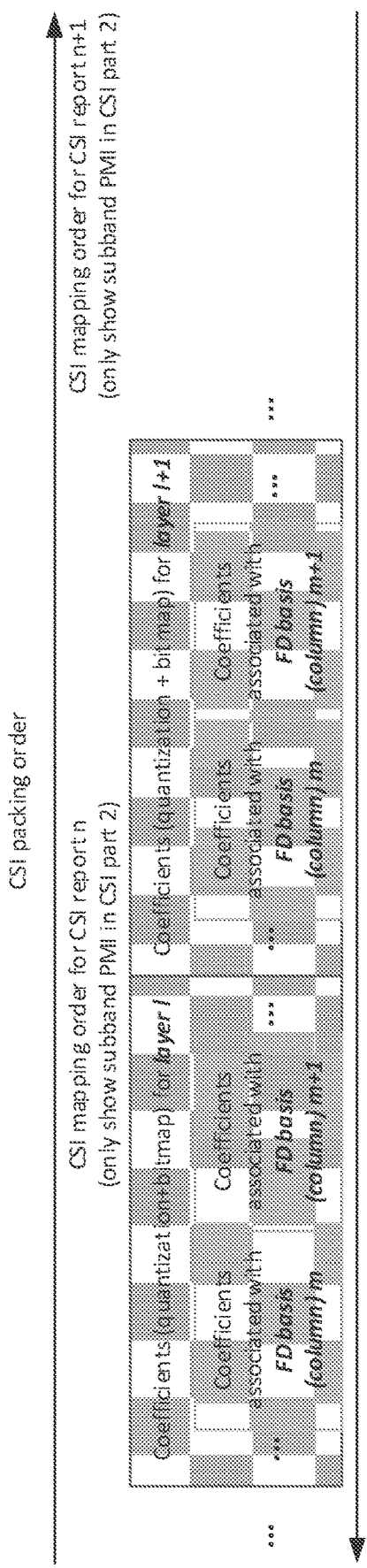
FIG. 9 is a diagram showing example CSI mapping order and omission order for the precoder matrix feedback with SD and FD compression, in accordance with certain aspects of the present disclosure.

Because the FD compressed feedback does not report per-subband, the Rel-15 omission cannot be reused. Thus, the coefficients can be mapped following any order of SD bases, FD bases and layers. FIG. 9 shows an example CSI mapping order and omission order for the precoder matrix feedback with SD and FD compression, in accordance with certain aspects of the present disclosure. As shown in FIG. 9, the CSI (shown only for the subband PMI part) can be packed into the report in order of layers, reporting the coefficients associated with an FD basis m for a layer, followed by coefficients for the next FD basis m+1 for the layer, and so on for the FD bases, and then repeating for the next layer, and so on again. In some examples, the CSI can be packed into the report in order of SD basis, layer, and FD basis. In this example, the coefficients for a FD basis m can be mapped across layers, followed by the coefficients for a next FD basis m+1 across the layers, and so on until the coefficients for each FD basis are mapped.

Figure 10:
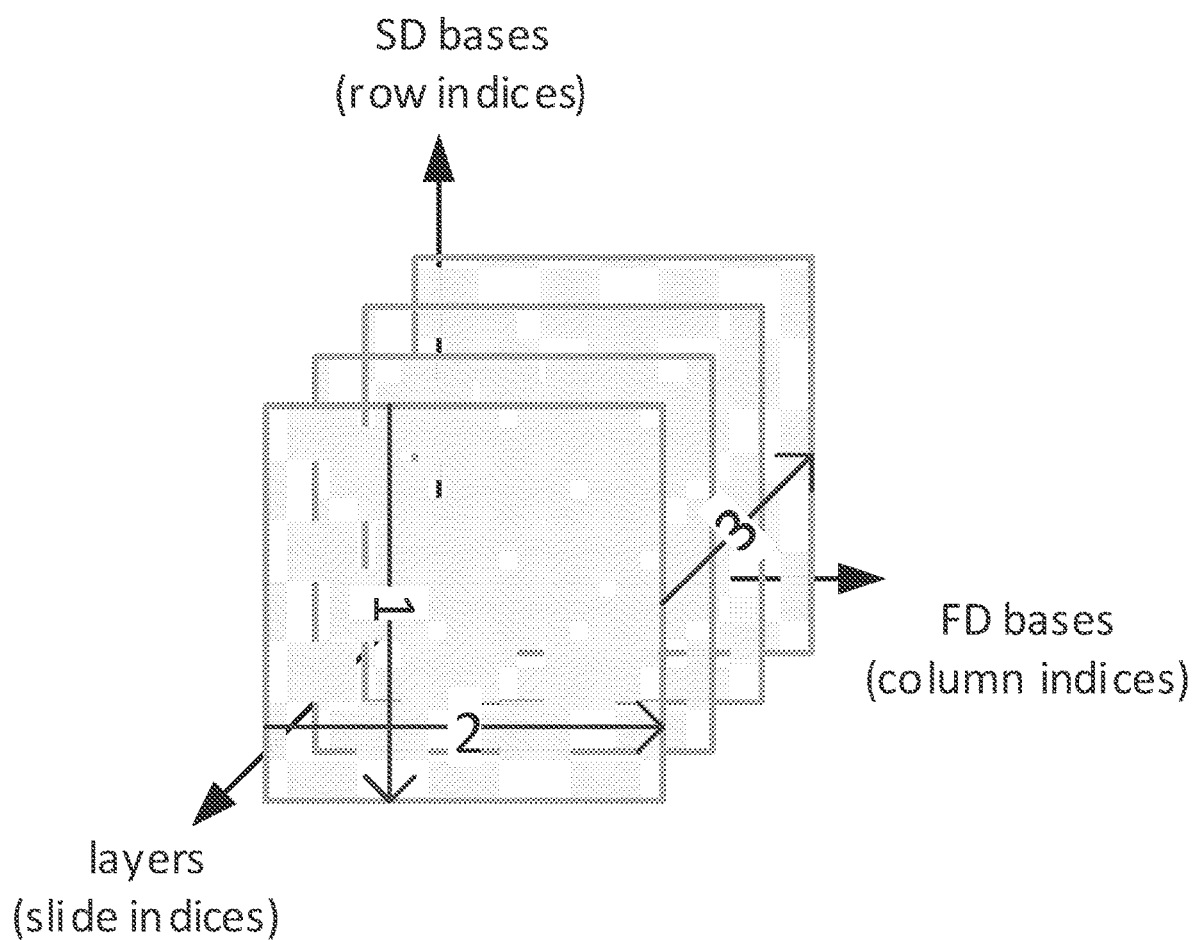
FIG. 10 is a diagram showing example SD and FD compression across multiple layers, in accordance with certain aspects of the present disclosure.

FIG. 10 is a diagram showing example SD and FD compression across multiple layers, in accordance with certain aspects of the present disclosure. For example, the coefficient mapping may include {bitmap of (column 0, slice 0), quantization of the NZCs of (column 0, slice 0)}, {bitmap of (column 1, slice 0), quantization of the NZCs of (column 1, slice 0)}, . . . , etc. In another example, the coefficient mapping includes {bitmap of (column 0, slice 0), quantization of the NZCs of (column 0, slice 0)}, {bitmap of (column 0, slice 1), quantization of the NZCs of (column 0, slide 1)}, . . . , etc.

In another example, coefficients may be grouped. In this case, the mapping includes the bitmap for a first group followed by the quantization of the first group; then the bitmap for a second group, followed by the quantization of the second group, so on. Each group contains a subset of NZCs, and within each group, the NZCs and their bitmap are mapped following any order of SD bases, FD bases or subbands, TD bases, layers. In an illustrative example, referring to FIG. 10, if the cube is split in half vertically, then one group can include the coefficients for the FD bases 0 to (M/2-1) across all of the SD bases and layers, and the other group can include the coefficients for the remaining FD bases (M/2 to (M-1)) across all of the SD bases and layer. In this case, the coefficient mapping includes {bitmap of (column 0, slice 0), bitmap of (column 1, slice 0), . . . , bitmap of (column $\lceil M/2 \rceil$-1, slice 0), bitmap of (column 0, slice 1), . . . , bitmap of (column $\lceil M/2 \rceil$-1, slide 1), quantization of the NZCs of (column 0, slice 0)}, quantization of the NZCs of (column 1, slice 0), . . . , quantization of the NZCs of (column $\lceil M/2 \rceil$-1, slice 0), quantization of the NZCs of (column 0, slice 1), . . . , quantization of the NZCs of (column $\lceil M/2 \rceil$-1, slide 1)}, {bitmap of (column $\lceil M/2 \rceil$, slice 0), . . . , {bitmap of (column M-1, slice 0), {bitmap of (column $\lceil M/2 \rceil$, slide 1), . . . , {bitmap of (column M-1, slide 1), quantization of the NZCs of (column $\lceil M/2 \rceil$, slice 0)}, . . . , quantization of the NZCs of (column M-1, slice 0), quantization of the NZCs of (column $\lceil M/2 \rceil$, slice 1), . . . quantization of the NZCs of (column M-1, slide 1)}. This is merely one example of coefficient grouping, other groupings of the coefficients can be used.

As shown in FIG. 9, if the UE needs to omit some CSI, it can do so in reverse order of the packing order.

Example CSI with SD and TD Compression

Figure 11:
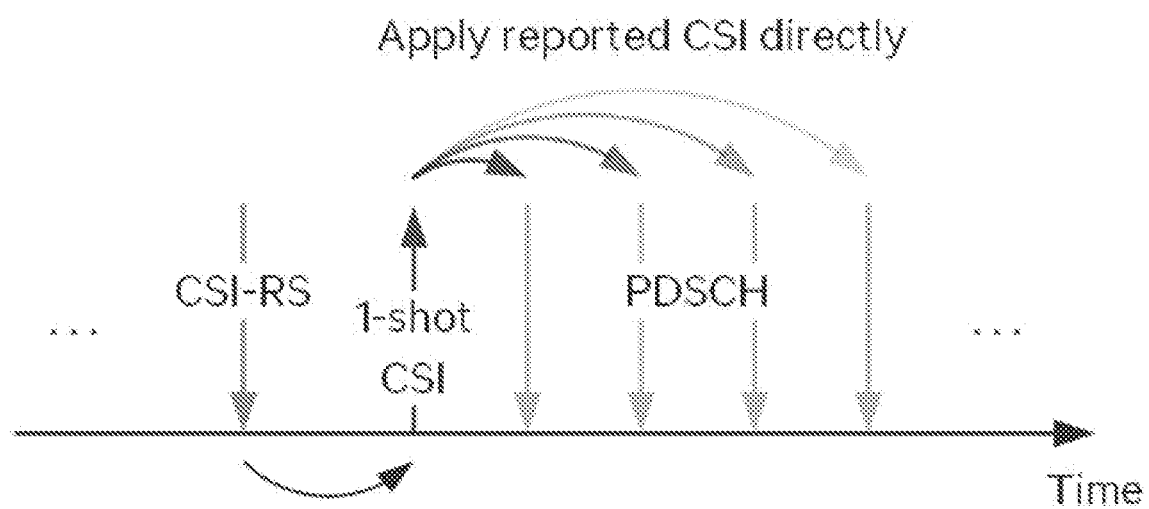
FIG. 11 is a diagram showing example one-shot CSI-RS and CSI, in accordance with certain aspects of the present disclosure.
Figure 12:
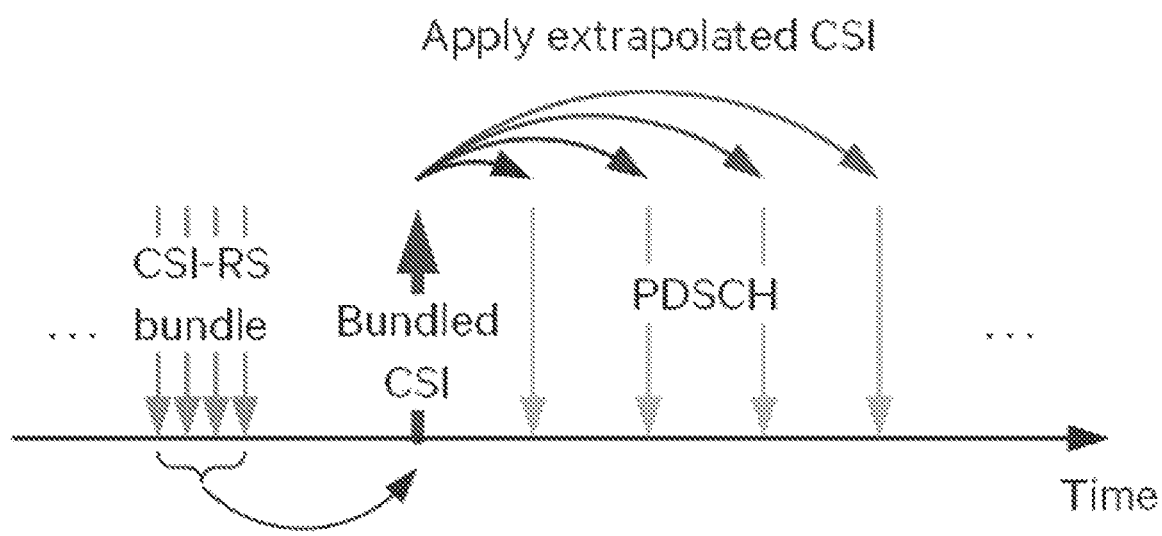
FIG. 12 is a diagram showing example bundled CSI-RS and CSI, in accordance with certain aspects of the present disclosure.

According to certain aspects, a 1-shot CSI-RS and CSI is used. As shown in FIG. 11, in the 1-shot CSI, a single CSI-RS is transmitted to the UE and the UE sends a CSI report for the CSI-RS based on measurement of the channel at time t. Thus, the precoder for the PDSCH(s) at time t+T are based on the channel at t. This latency may lead the CSI to be outdated (e.g., the channel may have changed since that earlier measurement), especially when the UE is moving. Thus, as shown in FIG. 12, a bundled CSI-RS may be used. This way, the measurements can be extrapolated to determine the expected channel at later times (e.g., t+T).

Figure 13:
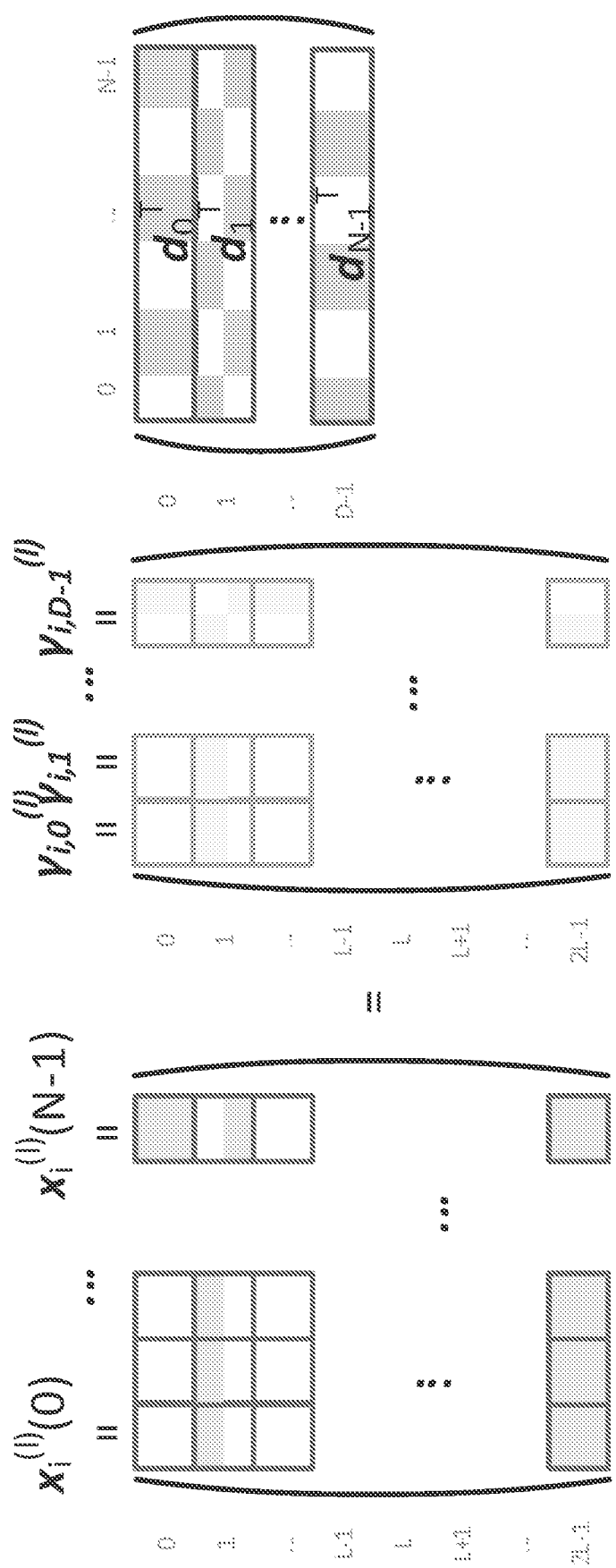
FIG. 13 is a diagram showing example precoder matrix feedback with SD and time domain (TD) compression, in accordance with certain aspects of the present disclosure.
Figure 14:
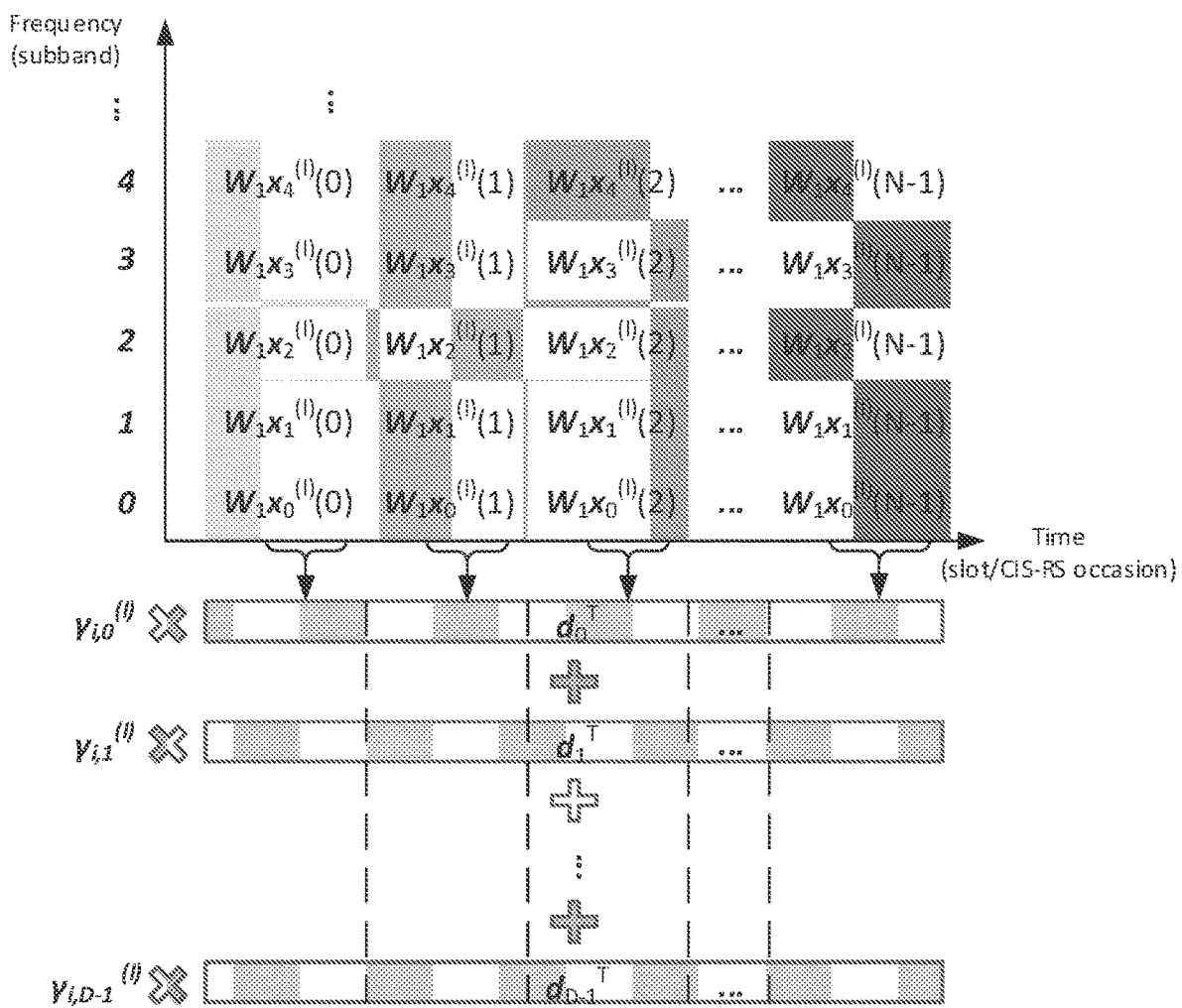
FIG. 14 is a diagram showing example precoder matrix feedback with SD and TD compression, in accordance with certain aspects of the present disclosure.

In some examples, the UE may estimate the channel/ precoder and report the Doppler frequency. The Doppler frequency (e.g., maximum Doppler frequency) in CSI captures the TD correlation. The BS (e.g., a gNB) can use the Doppler frequency to extrapolate and predicts CSI for future slots. The UE may further report coefficients used to perform time domain channel/precoder compression/extrapolation to help the BS predicate the CSI. FIG. 13 and FIG. 14 show example SD and TD compression. As shown, the CSI may be compressed in the time domain with bases d, for subbands i, and TD basis coefficients y. The precoder on N slot and subband i may be:

$$W_i^{(l)} = \begin{pmatrix} \sum_{k=0}^{L-1}\sum_{\tau=0}^{D-1} b_k \cdot x_{i,\tau,k}^{(l)} \cdot d_\tau^H \\ \sum_{k=0}^{L-1}\sum_{\tau=0}^{D-1} b_k \cdot x_{i,\tau,k+L}^{(l)} \cdot d_\tau^H \end{pmatrix}$$

Example CSI with SD, FD, and TD Compression

Figure 15:
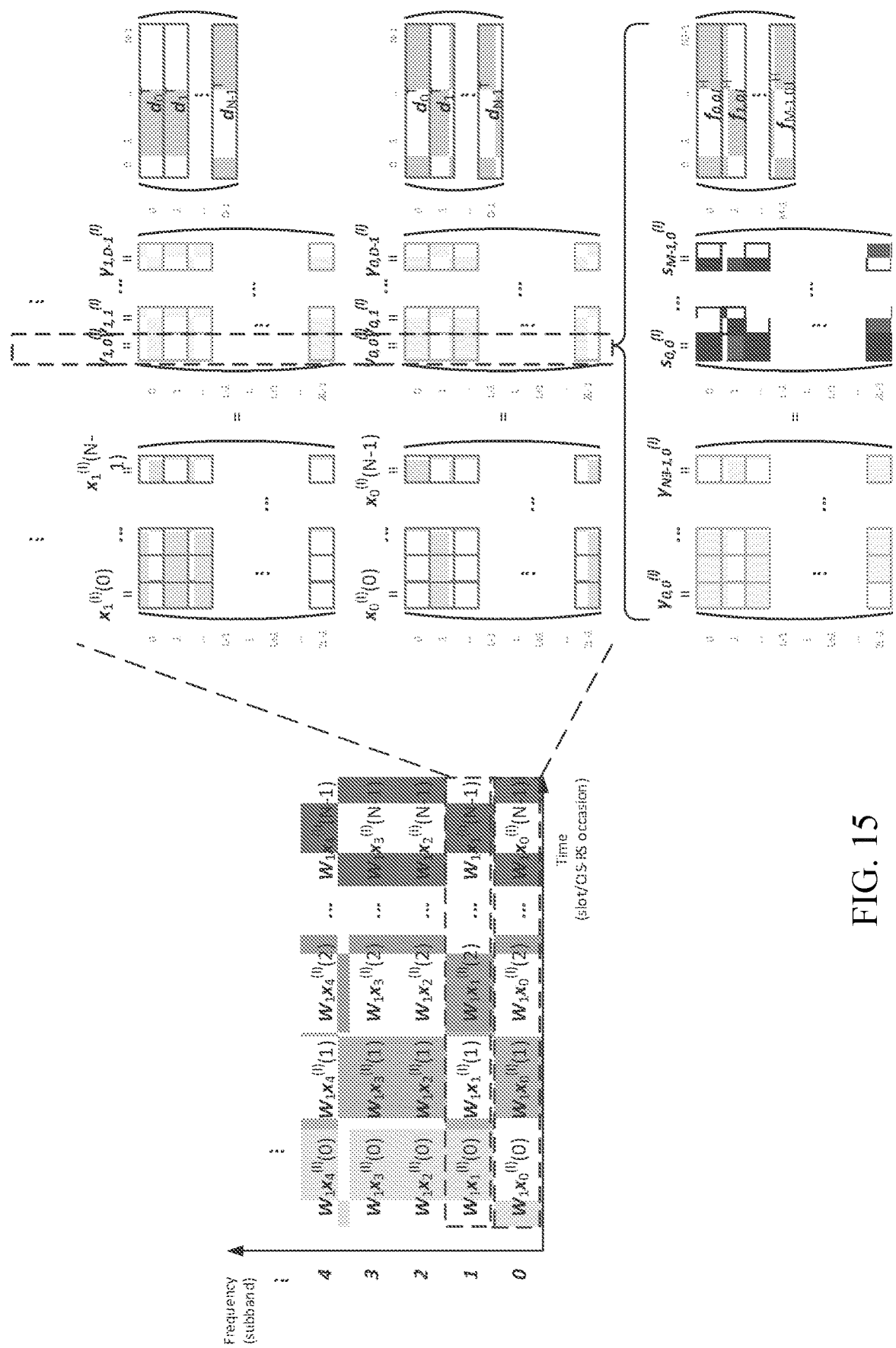
FIG. 15 is a diagram showing example precoder matrix feedback with SD, TD, and FD compression, in accordance with certain aspects of the present disclosure.

According to certain aspects, the CSI may be compressed in the frequency domain in addition to SD and TD compression. FIG. 15 is a diagram showing example precoder matrix feedback with SD, TD, and FD compression, in accordance with certain aspects of the present disclosure. The linear combination coefficients may be compressed in the TD domain. The UE can report the Doppler frequency used for TD bases derivation. The TD compressed linear combination coefficients may be compressed in the FD. In some examples, the FD compression may be applied TD-basis by TD-basis and layer-by-layer. For each specific TD basis, the UE may report a subset of the total 2LM coefficients. In some examples, a bitmap may be used to indicate position. The UE may report each NZC after quantization. In some examples, the UE may report up to $K_0$ coeffcients per layer $K_{NZ,i} \le K_0$. In some examples, the UE may report up to $2K_0$ coefficients across all layers $\Sigma_{l=0}^{Rl-1} K_{NZ,i} \le 2K_0$.

Accordingly, what is needed are techniques and apparatus for a mapping order and omissions rule/order for CSI with TD compression.

Example CSI Mapping and Omission with TD Compression

As discussed above, in certain systems (e.g., Release 17 5G NR systems), channel state information (CSI) feedback may be compressed in the time domain (TD), for example, in addition to compressed in the spatial domain (SD).

According to certain aspects, the CSI feedback is reported according to a mapping. For example, the CSI feedback is mapped (e.g., packed/assigned) in a CSI report according to a mapping order.

According to certain aspects, the linear combination coefficients can be mapped in any order of SD bases, layers, TD, bases, and subbands or FD bases. According to certain aspects, the mapping includes bitmaps indicating coefficient positions (e.g., the positions of up to $K_0$ NZP coefficients (NZC) for each layer), followed by the quantizations (i.e., the NZC). As discussed in more detail below, the coefficients may be grouped, where the mapping includes the bitmap for a first group followed by the quantization of the first group; then the bitmap for a second group, followed by the quantization of the second group, so on. Each group contains a subset of NZCs, and within each group, the NZCs and their bitmap are mapped following any order of SD bases, FD bases or subbands, TD bases, layers.

Figure 16:
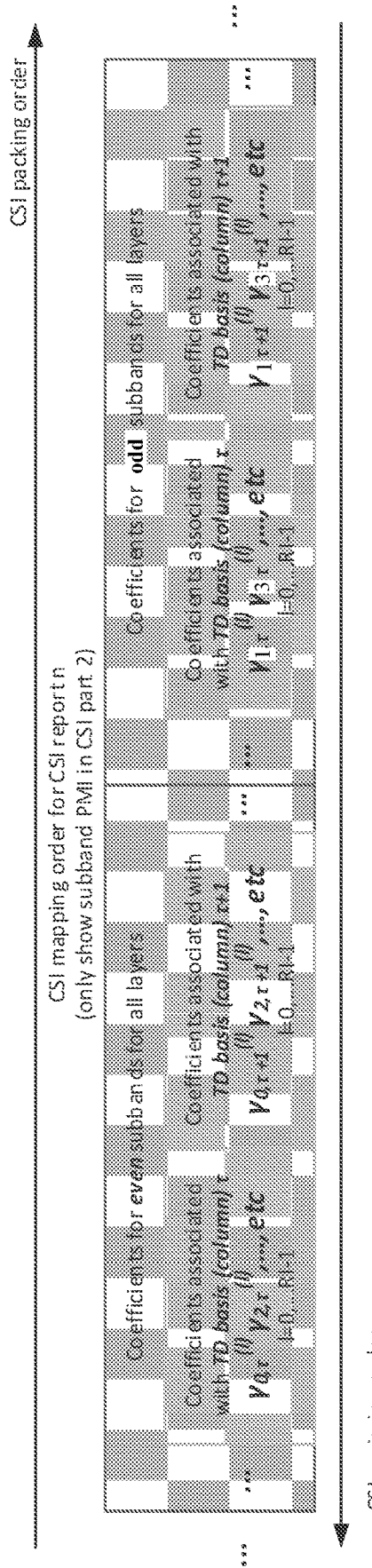
FIG. 16 is a diagram showing example mapping and omission for precoder matrix feedback with SD and TD compression, in accordance with certain aspects of the present disclosure.

In a first illustrative example, partially shown in FIG. 16, the coefficients may be SD and TD compressed. The coefficients γ may be mapped first for even subbands (e.g., 0, 2, 4, . . . , by coefficients of odd subbands (e.g., 1, 3, 5, . . . ). The coefficients for the even/odd subbands, can be mapped following the order SD bases, layers (e.g., l=0 . . . , R1-1), TD bases (τ=0, . . . , τ=D-1), and subbands. In this example, for a first TD basis, the even coefficients across the layers are mapped, then, for a next TD basis the even coefficients across the layers are mapped, until the coefficients for all the reported TD basis are mapped. Then, the coefficients for the odd subbands can be mapped in the same manner.

Figure 17:
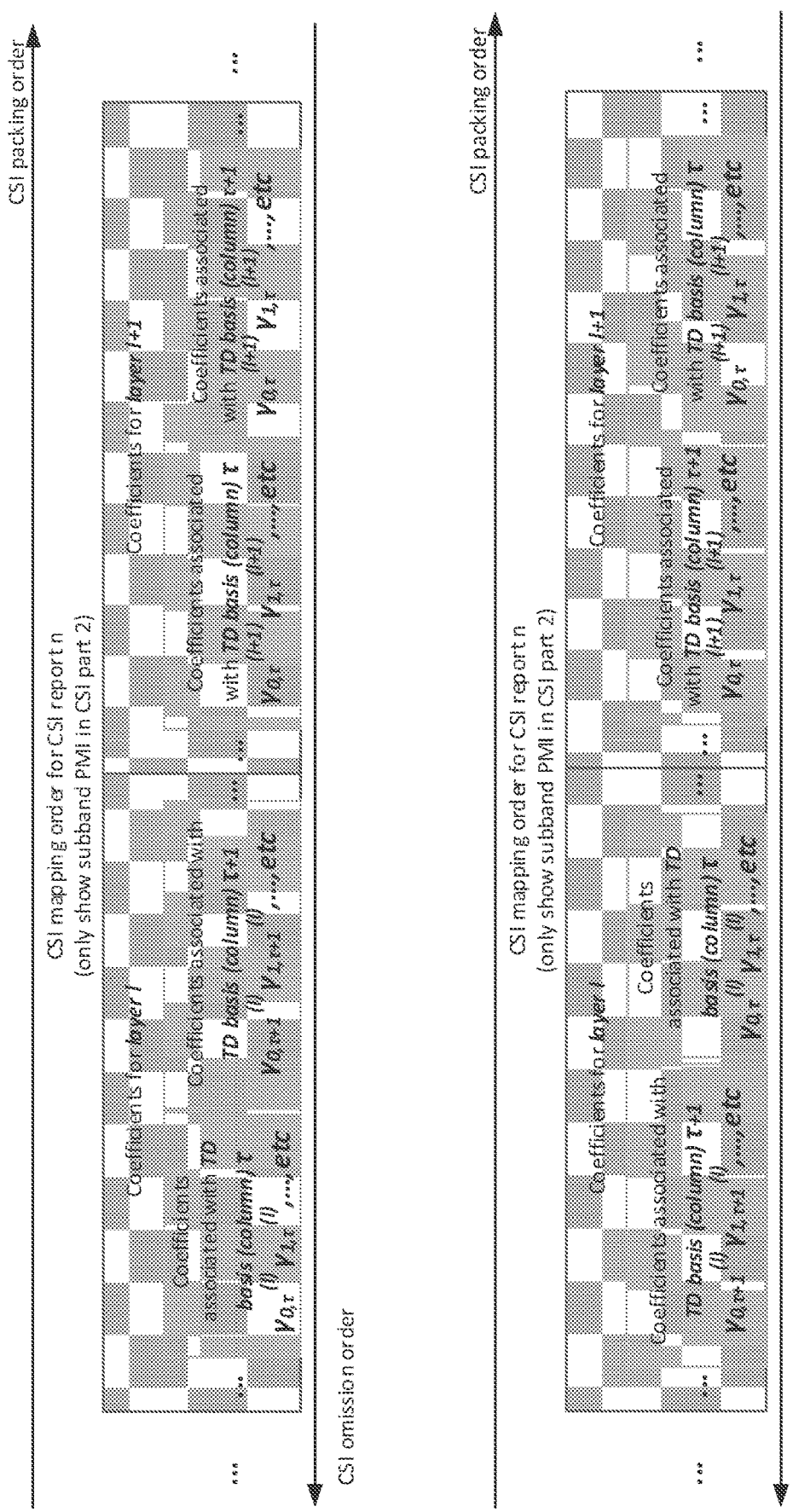
FIG. 17 is a diagram showing example mapping and omission for precoder matrix feedback with SD and TD compression, in accordance with certain aspects of the present disclosure.

In a second illustrative example, partially shown in FIG. 17, the coefficients may be SD and TD compressed. The coefficients for each layer can be mapped following the order SD bases, layers, subbands, and TD bases. In this example, for a first layer l, the coefficients associated with a TD basis are mapped across all reported subbands, then, for a next TD basis the coefficients across the subbands are mapped, until the coefficients for all the reported TD basis are mapped. Then, the coefficients for the next layer l+1 can be mapped in the same manner.

Figure 18:
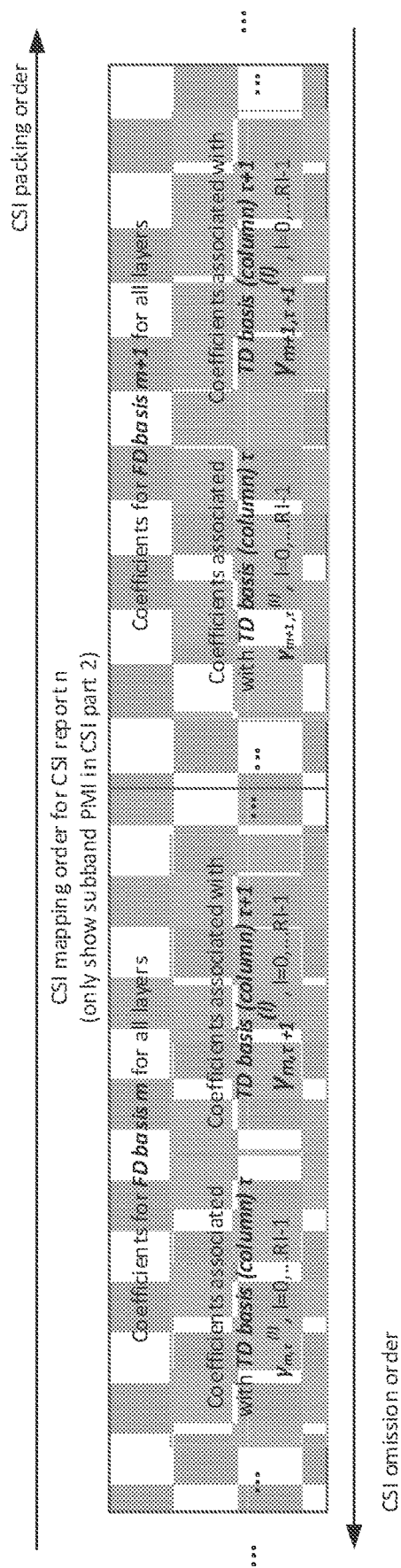
FIG. 18 is a diagram showing example mapping and omission for precoder matrix feedback with SD, TD, and FD compression, in accordance with certain aspects of the present disclosure.

In a third illustrative example, partially shown in FIG. 18, the coefficients may be SD, TD, and FD compressed. The coefficients for each FD basis (m=0, 1 . . . , M-1) can be mapped following the order SD bases, layers, TD basis, and FD bases. In this example, for a first FD basis m, the coefficients associated with a TD basis are mapped across all reported layers, then, for a next TD basis the coefficients across the layers are mapped, until the coefficients for all the reported TD basis are mapped. Then, the coefficients for the next FD basis m+1 can be mapped in the same manner. According to certain aspects, the mapping includes a bitmap and quantization. For the third illustrative example, the mapping may include, for each FD basis, a bitmap indicating the associated SD basis, layer, and TD basis, followed by the quantized coefficients for the associated SD basis, layer, and TD basis indicated by the bitmap. If the coefficients are grouped, then the mapping may include the bitmap for a first group followed by the quantization of the first group; then the bitmap for a second group, followed by the quantization of the second group, and so on. Each group contains a subset of NZCs. Within each group, the NZCs and their bitmap are mapped following the order of SD bases, layers, TD bases, and FD bases.

In a fourth illustrative example, the coefficients may be SD, TD, and FD compressed. The coefficients for each layer can be mapped following the order SD bases, TD bases, FD bases, and layers. In this example, for a first layer, the coefficients associated with an FD basis are mapped across all reported TD basis, then, for a next FD basis the coefficients across the TD basis are mapped, until the coefficients for all the reported FD basis are mapped. Then, the coefficients for the next layer can be mapped in the same manner. According to certain aspects, the mapping includes a bitmap and quantization. For the fourth illustrative example, the mapping may include, for each layer, a bitmap indicating the associated SD basis, FD basis, and TD basis followed by the quantized coefficients for the associated SD basis, FD basis, and TD bases. If the coefficients are grouped, then the mapping may include the bitmap for a first group followed by the quantization of the first group; then the bitmap for a second group, followed by the quantization of the second group, and so on. Each group contains a subset of NZCs. Within each group, the NZCs and their bitmap are mapped following the order of SD bases, TD bases, FD bases, and layers.

According to certain aspects, the linear combination coefficients can be grouped (e.g., according to a predefined rule) and then mapped based on the group indices. For example, a portion of coefficients across layers, SD bases, FD bases or subbands, and/or TD bases may be grouped. The UE and BS may know the grouping rule (e.g., defined in a 3GPP wireless standard). The CSI may then mapped according to group indices. Referring the four illustrative examples above, the coefficients could be grouped by a portions of FD bases across all SD basis, TD basis, and layers. For example, a first group may include the coefficients for half of the subbands or FD bases (0 to (M/2-1)) across all layers, SD bases, and TD bases, and a second group may include the coefficients for half of the FD bases (M/2 to (M-1)) across all layers, SD bases, and TD bases. Other groupings, and different numbers of groups, could also be used. In this example, the mapping may include first bitmap for first group, followed by the quantization of first group, and then a second bitmap for the second group, followed by the quantization of the second group. Each group contains a subset of NZCs. Within each group, the NZCs and their bitmap are mapped following any order of SD bases, FD bases or subbands, TD bases, layers.

According to certain aspects, the UE may further report the order of TD bases (e.g., whether coefficients for TD bases τ are mapped first or coefficients for TD bases τ+1 are mapped first, or other ordering of any number of TD bases). For example, the UE may map stronger coefficients before mapping weaker coefficients, which may be in a different order than the order of the TD bases.

According to certain aspects, the UE may determine to omit a portion of the CSI payload from the CSI report. For example, based on allocated uplink resource(s) and the size of the CSI payload, the UE can determine CSI omission is needed (e.g., when the allocated resource is smaller than the size of the CSI payload). In some examples, the UE first omits CSI components with lowest priority, such as following the reverse order of the CSI mapping.

Figure 19:
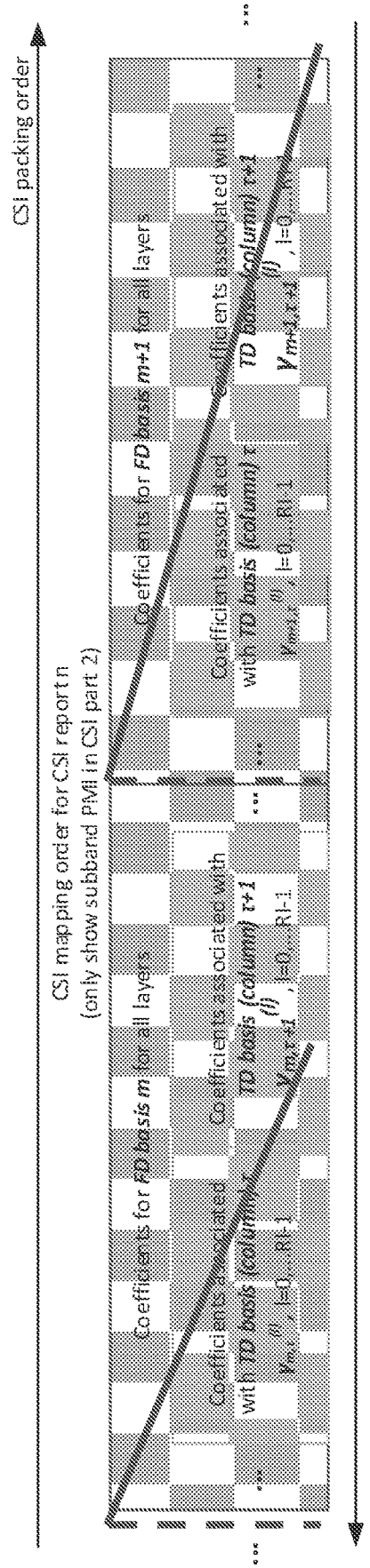
FIG. 19 is a diagram showing example block-by-block fixed omission for precoder matrix feedback with SD and TD compression, in accordance with certain aspects of the present disclosure.

According to certain aspects, the portion (e.g., amount) of CSI payload to omit is predefined. For example, the portion may be hardcoded (e.g., fixed in the 3GPP wireless standards). As shown in FIG. 19, the omission is performed block-by-block. In this case, the UE may omit the CSI block with lowest priority (this CSI block may contain the second half of the NZCs and/or second half of the bitmaps), and check whether the uplink resource is sufficient to carry the remaining CSI; if not, the UE further omits the CSI block with the second lowest priority (this CSI block may contain the first half of the NZCs and/or first half of the bitmaps), and so on until the uplink resource is sufficient to carry the remaining CSI. Each block may correspond to coefficients associated with a highest order of the mapping. For example, referring to the illustrative mapping order shown in FIG. 18, and as shown in FIG. 19, each block may correspond to the coefficients associated with one FD basis (e.g., across all layers, TD bases, and SD bases).

Figure 20:
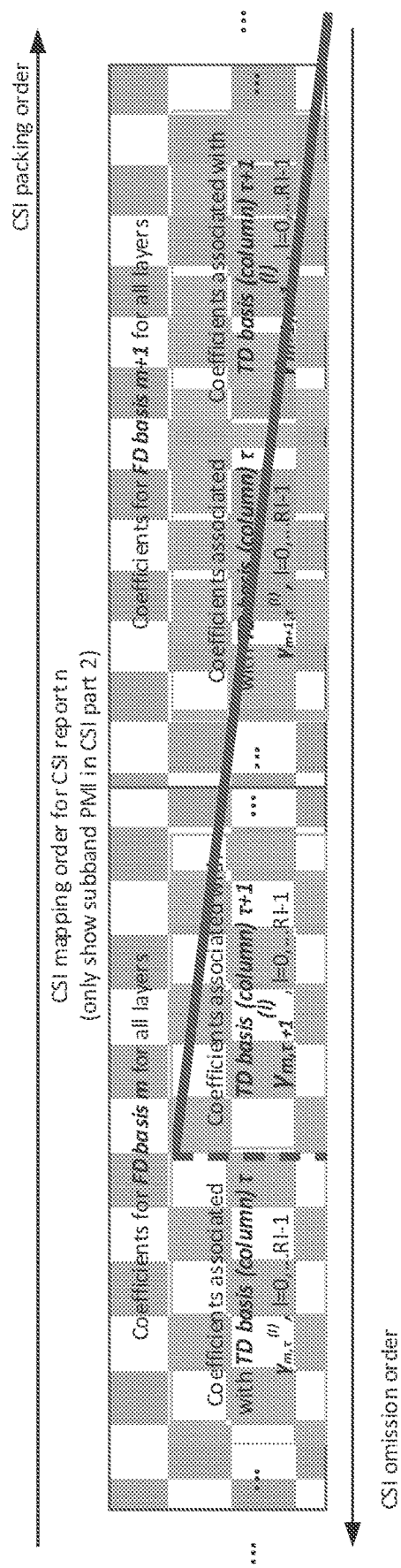
FIG. 20 is a diagram showing example calculated omission for precoder matrix feedback with SD and TD compression starting from the end of the CSI report, in accordance with certain aspects of the present disclosure.

According to certain aspects, the portion of CSI omission is calculated. For example, the UE may calculated the portion of CSI to omit based on the difference of the total CSI payload and the maximum payload the UL resource can carry. In some examples, the UE then omits the calculated portion from the end of the CSI report. For example, referring to the illustrative mapping order shown in FIG. 18, and as shown in FIG. 20, the last block is omitted, and then only a portion of the next block is omitted.

Figure 21:
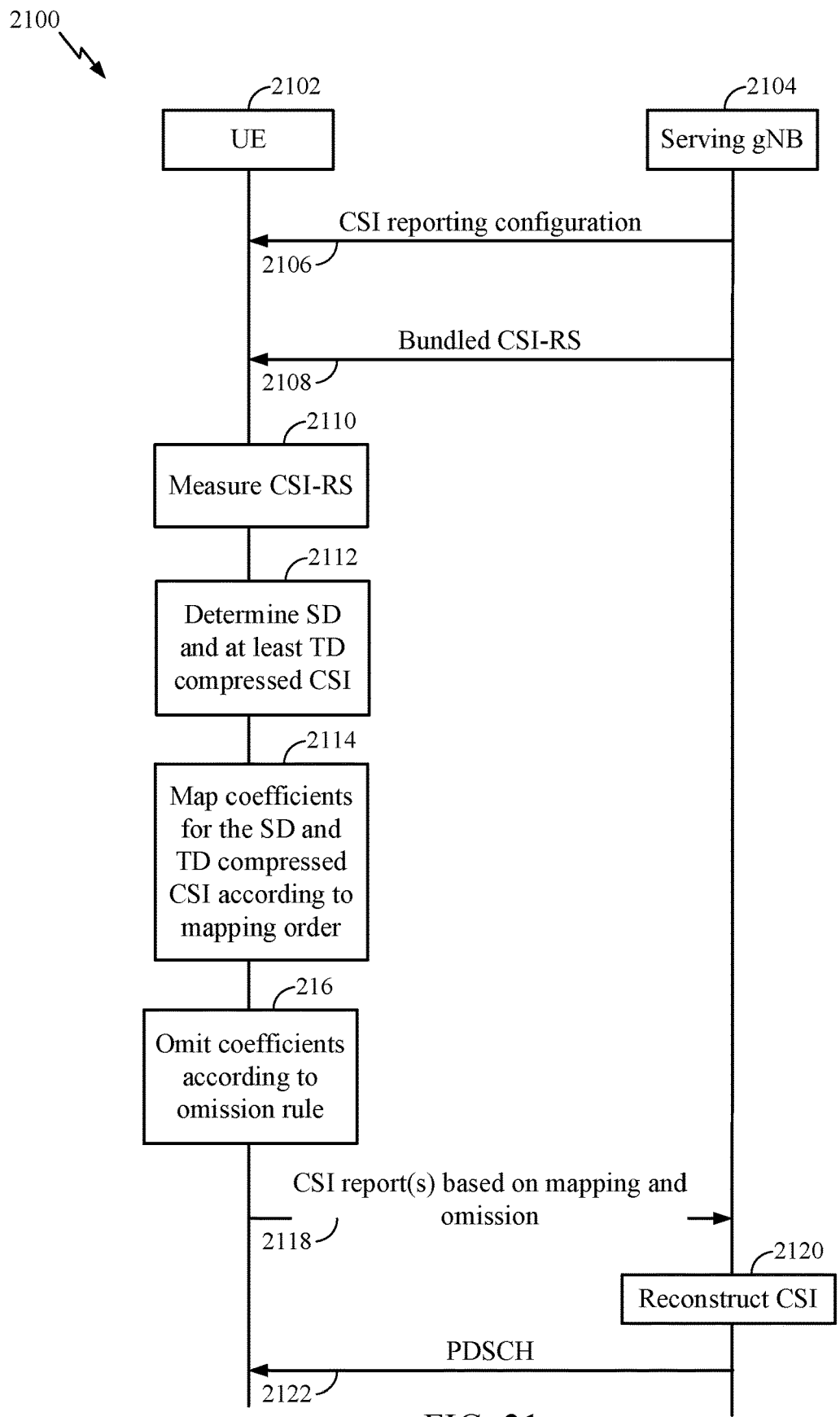
FIG. 21 is a call flow diagram illustrating example mapping and omission for TD compressed CSI, in accordance with certain aspects of the present disclosure.

FIG. 21 is a call flow 2100 diagram illustrating example mapping and omission for TD compressed CSI, in accordance with certain aspects of the present disclosure. At 2106, the UE 2102 may receive a CSI reporting configuration from the serving gNB 2104. At 2108, the UE 2102 may receive a bundled CSI-RS from the serving gNB 2104. At 2110, the UE 2102 measures the CSI-RS and, at 2112, the UE 2102 determines SD and at least TD compressed CSI. At 2114, the UE 2102 maps coefficients for the SD and TD compressed CSI according to a mapping order. At 2116, the UE 2102, omits coefficients according to an omission rule. At 2118, the UE 2102 sends the CSI report(s) based on the mapping and omission. At 2120, the serving gNB 2014 reconstructs the CSI. At 2122, the serving gNB 2014 may send PDSCH to the UE 2102 (e.g., precoded based on the reconstructed CSI).

Figure 22:
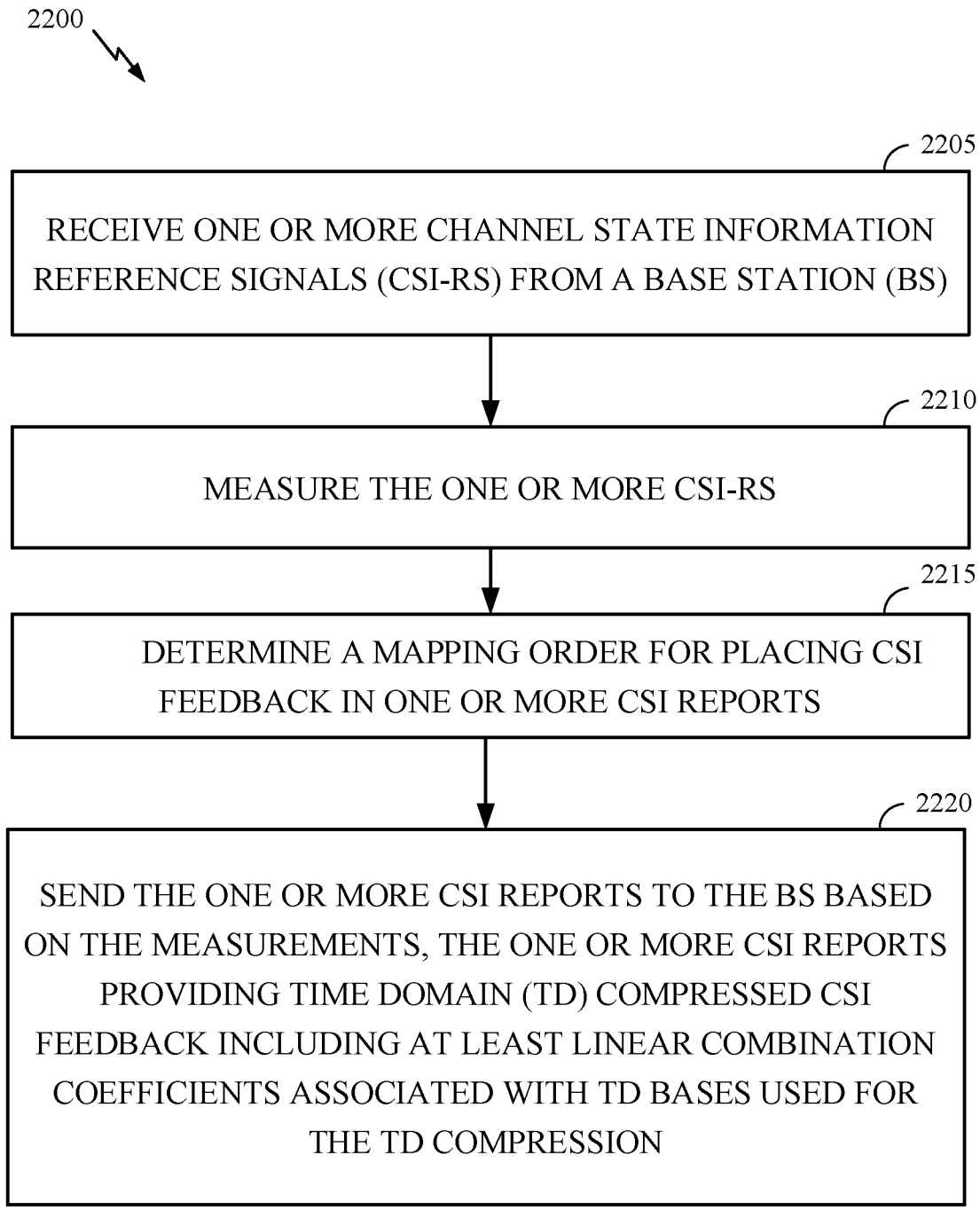
FIG. 22 is a flow diagram illustrating example operations for wireless communication by a UE, in accordance with certain aspects of the present disclosure.

FIG. 22 is a flow diagram illustrating example operations 2200 for wireless communication, in accordance with certain aspects of the present disclosure. The operations 2200 may be performed, for example, by UE (e.g., such as a UE 120a in the wireless communication network 100). Operations 2200 may be implemented as software components that are executed and run on one or more processors (e.g., controller/processor 280 of FIG. 2). Further, the transmission and reception of signals by the UE in operations 2200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 2200 may begin, at 2205, by receiving one or more CSI-RS from a BS.

At 2210, the UE measures the one or more CSI-RS.

At 2215, the UE determines a mapping order for placing CSI feedback in one or more CSI reports.

At 2220, the UE sends the one or more CSI reports to the BS based on the measurements, the one or more CSI reports providing time domain (TD) compressed CSI feedback including at least linear combination coefficients associated with TD bases used for the TD compression.

In a first aspect, the UE further compresses the CSI feedback compressed in at least one of the SD or the FD.

In a second aspect, alone or in combination with the first aspect, the mapping order includes placing CSI feedback in each CSI report in any order of SD bases, TD bases, layers, and subbands or FD bases.

In a third aspect, alone or in combination with one or more of the first aspect and second aspects, the mapping comprises a bitmap indicating coefficients positions according to the any order of SD bases, TD bases, layers, and FD bases or subbands, followed by quantized coefficients associated with SD bases, TD bases, layers, and FD bases or subbands.

In a fourth aspect, alone or in combination with one or more of the first through third aspects, the mapping order comprises grouping the linear combination coefficients according to a configured rule and mapping the linear combination coefficients in order of group indices.

In a fifth aspect, alone or in combination with one or more of the first through sixth aspects, the mapping comprises, for each grouping, a bitmap indicating coefficients positions according to the any order of SD bases, TD bases, layers, and FD bases or subbands, followed by quantized coefficients associated with SD bases, TD bases, layers, and FD bases or subbands.

In a sixth aspect, alone or in combination with one or more of the first through fifth aspects, wherein the method further comprises providing an indication to the BS of an order of the TD bases at which the associated linear combination coefficients are mapped.

In a seventh aspect, alone or in combination with one or more of the first through sixth aspects, the method further comprises determining an allocated uplink resource is insufficient to carry the entire CSI report; and omitting a portion of the CSI feedback from at least one of the one or more CSI reports, wherein the portion of the CSI feedback to omit is preconfigured, hardcoded, or fixed according a wireless standard.

In an eighth aspect, alone or in combination with one or more of the first through seventh aspects, omitting the portion of the CSI feedback comprises omitting the portion of the CSI feedback block by block following a priority order, until the uplink resource is sufficient to carry the CSI report after omission.

In a ninth aspect, alone or in combination with one or more of the first through eighth aspects, the omission starts from the block with the lowest priority order, and the priority order corresponds to an order of a mapping of the blocks to the CSI reports.

In a tenth aspect, alone or in combination with one or more of the first through ninth aspects, each block corresponds to the linear combination coefficients associated with a group index, an SD base, TD base, layer, FD base, or set of subbands.

In an eleventh aspect, alone or in combination with one or more of the first through tenth aspects, each block further corresponds to a bitmap indicating coefficients positions according to the any order of SD bases, TD bases, layers, and FD bases or subbands.

In a twelfth aspect, alone or in combination with one or more of the first through eleventh aspects, the method further comprises determining an allocated uplink resource is insufficient to carry the entire CSI report; calculating a portion of CSI feedback to omit based on a total payload of the CSI feedback and maximum available payload size at the UE; and omitting the portion of the CSI feedback from the CSI report.

In a thirteenth aspect, alone or in combination with one or more of the first through twelfth aspects, the omission starts from the block with the lowest priority order, and the priority order corresponds to an order of a mapping of the blocks to the CSI reports.

In a fourteenth aspect, alone or in combination with one or more of the first through thirteenth aspects, each block corresponds to the linear combination coefficients associated with a group index, an SD base, TD base, layer, FD base, or set of subbands.

In a fifteenth aspect, alone or in combination with one or more of the first through fourteenth aspects, each block further includes a bitmap indicating coefficients positions according to the any order of SD bases, TD bases, layers, and FD bases or subbands.

In a sixteenth aspect, alone or in combination with one or more of the first through fifteenth aspects, the one or more CSI-RS comprises a bundled plurality of CSI-RS transmitted at different times; and the CSI feedback is based on the bundled plurality of CSI-RS.

In a seventeenth aspect, alone or in combination with one or more of the first through sixteenth aspects, the CSI feedback includes a Doppler frequency.

Figure 23:
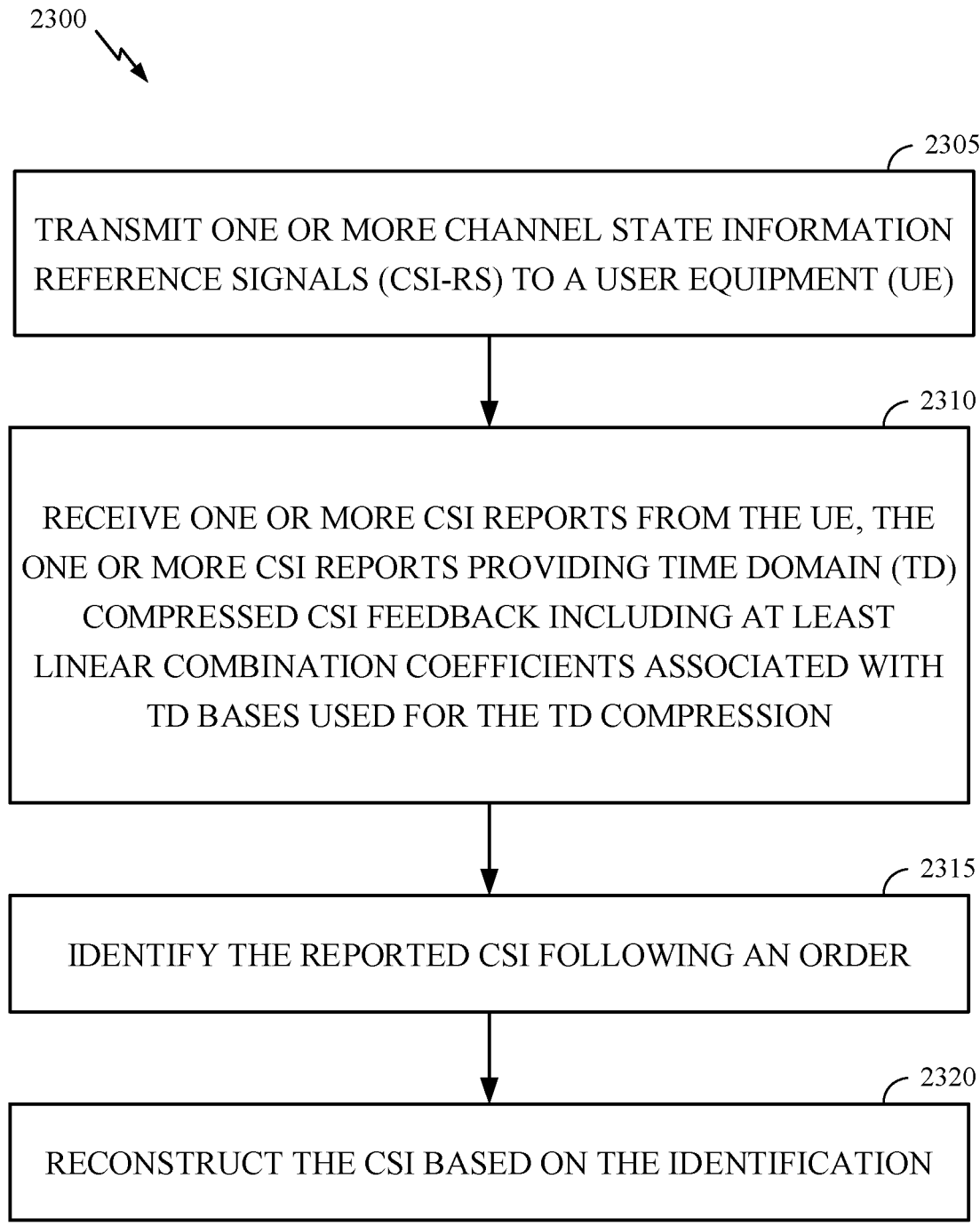
FIG. 23 is a flow diagram illustrating example operations for wireless communication by a BS, in accordance with certain aspects of the present disclosure.

FIG. 23 is a flow diagram illustrating example operations 2300 for wireless communication, in accordance with certain aspects of the present disclosure. The operations 2300 may be performed, for example, by a BS (e.g., such as the BS 110a in the wireless communication network 100). The operations 2300 may be complimentary operations by the BS to the operations 2200 performed by the UE. Operations 2300 may be implemented as software components that are executed and run on one or more processors (e.g., controller/processor 240 of FIG. 2). Further, the transmission and reception of signals by the BS in operations 2300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 2300 may begin, at 2305, by transmitting one or more CSI-RS to a UE.

At 2310, the BS receives one or more CSI reports from the UE, the one or more CSI reports providing TD compressed CSI feedback including at least linear combination coefficients associated with TD bases used for the TD compression.

At 2315, the BS identifies the reported CSI following an order; and

At 2320, the BS reconstructs the CSI based on the identification

In a first aspect, the BS determines one or more precoders for one or more PDSCH transmissions to the UE based on the one or more CSI reports.

In a second aspect, alone or in combination with the first aspect, the CSI feedback is further compressed in at least one of the SD or the FD.

In a third aspect, alone or in combination with one or more of the first aspect and second aspects, the CSI feedback in each CSI report is in any order of SD bases, TD bases, layers, FD bases, and subbands or FD bases.

In a fourth aspect, alone or in combination with one or more of the first through third aspects, the mapping comprises a bitmap indicating coefficients positions according to the any order of SD bases, TD bases, layers, and FD bases or subbands, followed by quantized coefficients associated with SD bases, TD bases, layers, and FD bases or subbands In a fifth aspect, alone or in combination with one or more of the first through fourth aspects, the linear combination coefficients are grouped according to a configured rule and the CSI feedback in each CSI report is received in order of group indices.

In a sixth aspect, alone or in combination with one or more of the first through fifth aspects, the mapping comprises, for each group, a bitmap indicating coefficients positions according to the any order of SD bases, TD bases, layers, and FD bases or subbands, followed by quantized coefficients associated with SD bases, TD bases, layers, and FD bases or subbands.

In a seventh aspect, alone or in combination with one or more of the first through sixth aspects, the BS receives an indication from the UE of an order of the TD bases at which the associated linear combination coefficients are mapped.

In an eighth aspect, alone or in combination with one or more of the first through seventh aspects, the one or more CSI-RS comprises a bundled plurality of CSI-RS transmitted at different times; and the CSI feedback is based on the bundled plurality of CSI-RS.

In a ninth aspect, alone or in combination with one or more of the first through tenth aspects, the CSI feedback includes a Doppler frequency.

In a tenth aspect, alone or in combination with one or more of the first through ninth aspects, the method further comprises determining the entire CSI payload size based on a first part of CSI report; determining whether the UE omits at least a portion of the CSI from a second part of the CSI based on whether an allocated uplink resource is sufficient to carry the entire CSI report, wherein the portion of the CSI feedback to omit is preconfigured, hardcoded, or fixed according a wireless standard.

In an eleventh aspect, alone or in combination with one or more of the first through tenth aspects, the portion of the CSI feedback is omitted block by block following a priority order, until the uplink resource is sufficient to carry the CSI report after omission.

In a twelfth aspect, alone or in combination with one or more of the first through eleventh aspects, the omission starts from the block with the lowest priority order, and the priority order corresponds to an order of a mapping of the blocks to the CSI reports.

In a thirteenth aspect, alone or in combination with one or more of the first through twelfth aspects, each block corresponds to the linear combination coefficients associated with a group index, an SD base, TD base, layer, FD base, or set of subbands.

In a fourteenth aspect, alone or in combination with one or more of the first through thirteenth aspects, each block further includes a bitmap indicating coefficients positions according to the any order of SD bases, TD bases, layers, and FD bases or subbands.

In a fifteenth aspect, alone or in combination with one or more of the first through fourteenth aspects, the method further comprises determining whether the UE omits at least a portion of the CSI feedback based on whether an allocated uplink resource is sufficient to carry the entire CSI report, wherein the portion of the CSI feedback is omitted starting from the block with the lowest priority order, and the priority order corresponds to an order of a mapping of the blocks to the CSI reports.

In a sixteenth aspect, alone or in combination with one or more of the first through fifteenth aspects, each block corresponds to the linear combination coefficients associated with a group index, an SD base, TD base, layer, FD base, or set of subbands.

In a seventeenth aspect, alone or in combination with one or more of the first through sixteenth aspects, each block further comprises a bitmap indicating coefficients positions according to the any order of SD bases, TD bases, layers, and FD bases or subbands.

Figure 24:
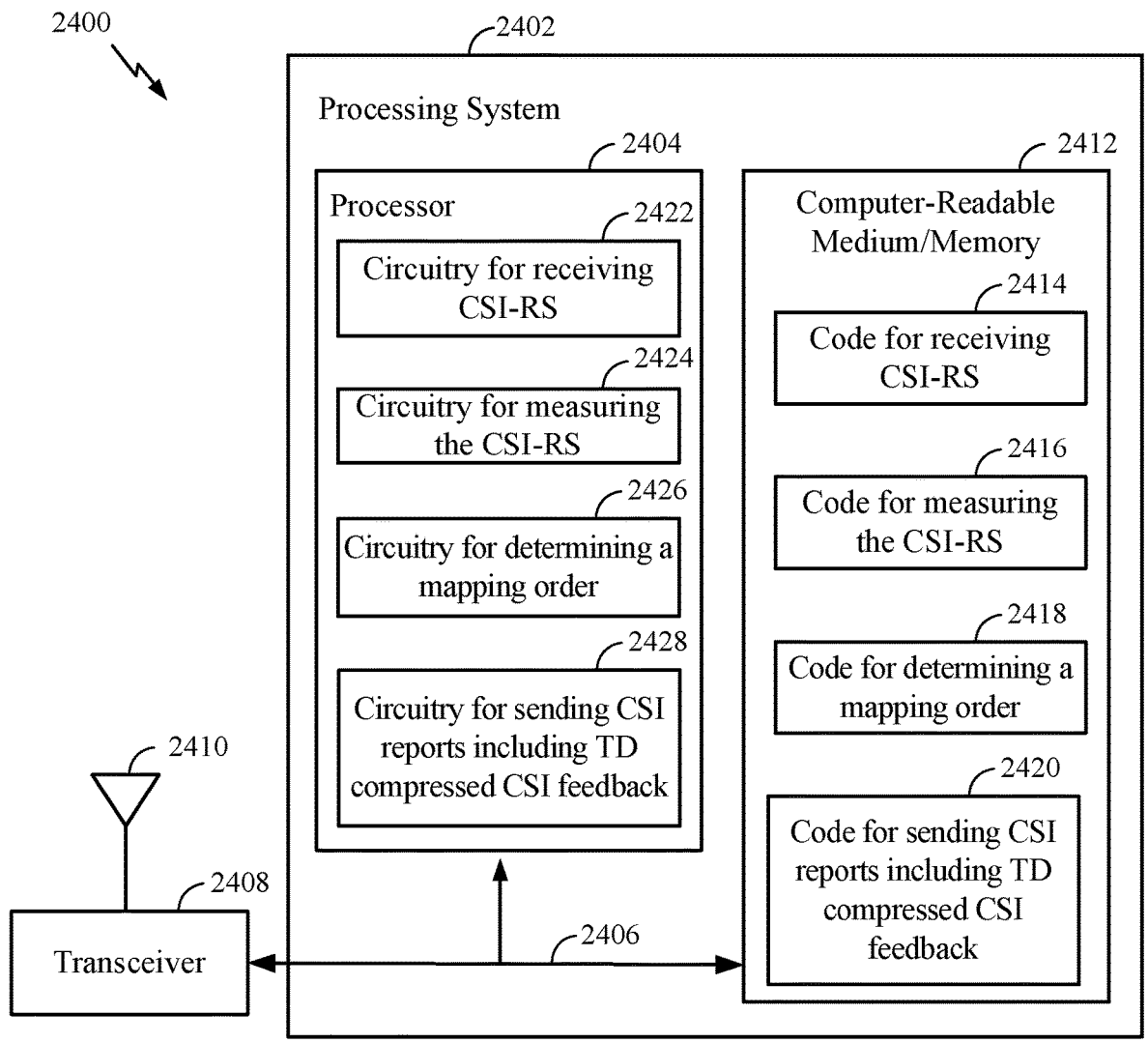
FIG. 24 illustrates a communications device that may include various components configured to perform operations for the techniques disclosed herein in accordance with aspects of the present disclosure.

FIG. 24 illustrates a communications device 2400 that may include various components (e.g., corresponding to means-plus-function components) configured to perform operations for the techniques disclosed herein, such as the operations illustrated in FIG. 22. The communications device 2400 includes a processing system 2402 coupled to a transceiver 2408 (e.g., a transmitter and/or a receiver). The transceiver 2408 is configured to transmit and receive signals for the communications device 2400 via an antenna 2410, such as the various signals as described herein for CSI reporting with TD compression. The processing system 2402 may be configured to perform processing functions for the communications device 2400, including processing signals received and/or to be transmitted by the communications device 2400.

The processing system 2402 includes a processor 2404 coupled to a computer-readable medium/memory 2412 via a bus 2406. In certain aspects, the computer-readable medium/memory 2412 is configured to store instructions (e.g., computer-executable code) that when executed by the processor 2404, cause the processor 2404 to perform the operations illustrated in FIG. 22, or other operations for performing the various techniques discussed herein for CSI reporting with TD compression. In certain aspects, computer-readable medium/memory 2412 stores code 2414 for receiving one or more CSI-RS from a BS; code 2416 for measuring the one or more CSI-RS; code 2418 for determining a mapping order for placing CSI feedback in one or more CSI reports; and code 2420 for sending the one or more CSI reports to the BS based on the measurements, the one or more CSI reports providing TD compressed CSI feedback including at least linear combination coefficients associated with TD bases used for the TD compression, in accordance with aspects of the present disclosure. In certain aspects, the processor 2404 has circuitry configured to implement the code stored in the computer-readable medium/memory 2412. The processor 2404 includes circuitry 2422 for receiving one or more CSI-RS from a BS; circuitry 2424 for measuring the one or more CSI-RS; circuitry 2426 for determining a mapping order for placing CSI feedback in one or more CSI reports; and circuitry 2428 for sending the one or more CSI reports to the BS based on the measurements, the one or more CSI reports providing TD compressed CSI feedback including at least linear combination coefficients associated with TD bases used for the TD compression, in accordance with aspects of the present disclosure.

Figure 25:
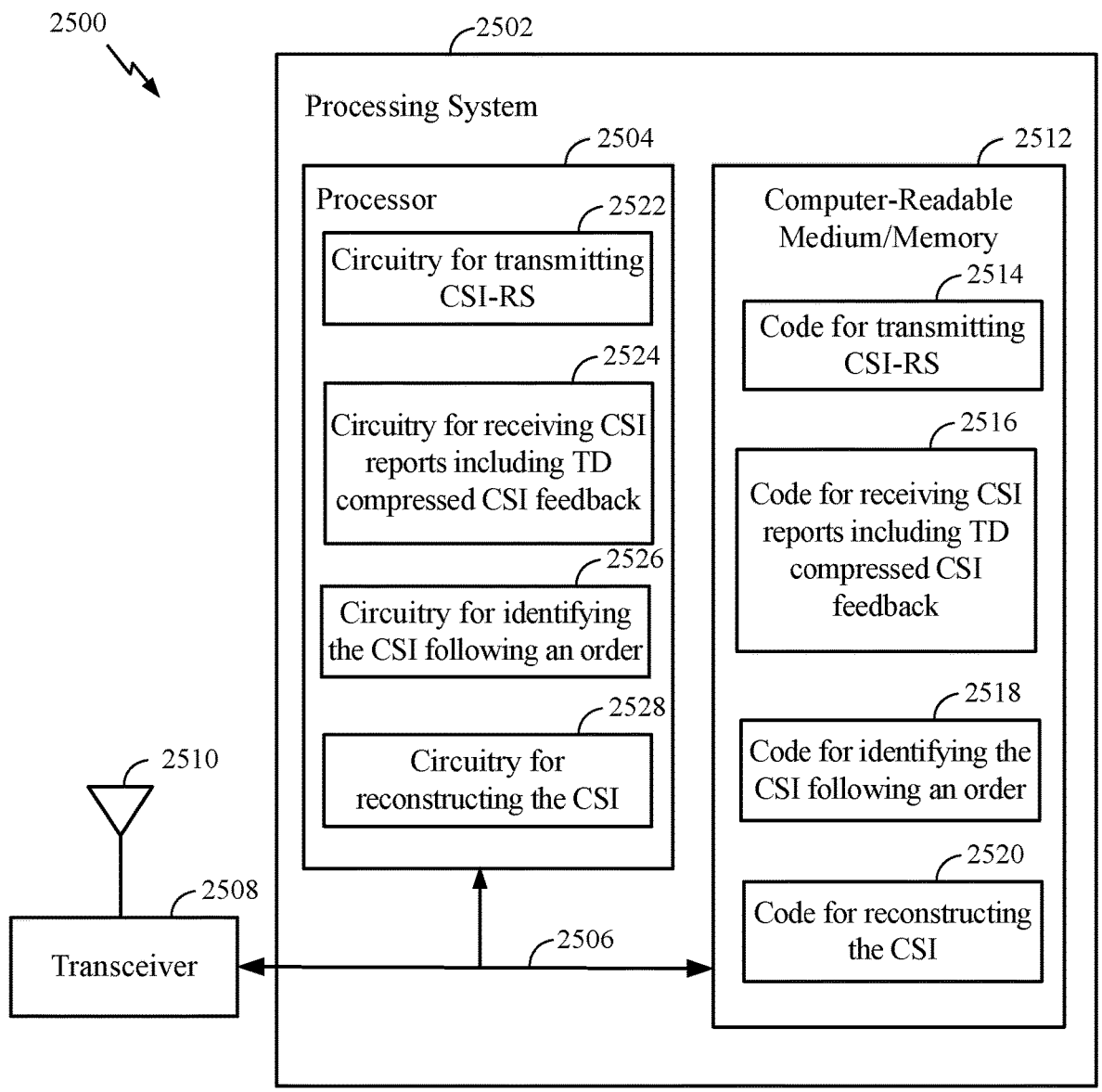
FIG. 25 illustrates a communications device that may include various components configured to perform operations for the techniques disclosed herein in accordance with aspects of the present disclosure.

FIG. 25 illustrates a communications device 2500 that may include various components (e.g., corresponding to means-plus-function components) configured to perform operations for the techniques disclosed herein, such as the operations illustrated in FIG. 23. The communications device 2500 includes a processing system 2502 coupled to a transceiver 2508 (e.g., a transmitter and/or a receiver). The transceiver 2508 is configured to transmit and receive signals for the communications device 2500 via an antenna 2510, such as the various signals as described herein for CSI reporting with TD compression. The processing system 2502 may be configured to perform processing functions for the communications device 2500, including processing signals received and/or to be transmitted by the communications device 2500.

The processing system 2502 includes a processor 2504 coupled to a computer-readable medium/memory 2512 via a bus 2506. In certain aspects, the computer-readable medium/memory 2512 is configured to store instructions (e.g., computer-executable code) that when executed by the processor 2504, cause the processor 2504 to perform the operations illustrated in FIG. 23, or other operations for performing the various techniques discussed herein for CSI reporting with TD compression. In certain aspects, computer-readable medium/memory 2512 stores code 2514 for transmitting one or more CSI-RS to a UE; code 2516 for receiving one or more CSI reports from the UE, the one or more CSI reports providing TD compressed CSI feedback including at least linear combination coefficients associated with TD bases used for the TD compression; code 2518 for identifying the reported CSI following an order; and code 2520 for reconstructing the CSI based on the identification, in accordance with aspects of the present disclosure. In certain aspects, the processor 2504 has circuitry configured to implement the code stored in the computer-readable medium/memory 2512. The processor 2504 includes circuitry 2522 for transmitting one or more CSI-RS to a UE; and circuitry 2524 for receiving one or more CSI reports from the UE, the one or more CSI reports providing TD compressed CSI feedback including at least linear combination coefficients associated with TD bases used for the TD compression; circuitry 2526 for identifying the reported CSI following an order; and circuitry 2528 for reconstructing the CSI based on the identification, in accordance with aspects of the present disclosure The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 22 and/or FIG. 23.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
   receiving one or more channel state information reference signals (CSI-RS);
   measuring the one or more CSI-RS;
   generating compressed CSI feedback based on the measuring of the one or more CSI-RS, wherein the CSI feedback is compressed in a time domain (TD) using TD bases;
   determining a mapping order for placing the compressed CSI feedback in one or more CSI reports; and
   sending the one or more CSI reports providing the compressed CSI feedback including at least linear combination coefficients associated with the TD bases.

2. The method of claim 1, wherein the compressed CSI feedback is further compressed in a spatial domain (SD) using SD bases, a frequency domain (FD) using subbands or FD bases, or both.

3. The method of claim 2, wherein determining the mapping order comprises determining the mapping order for placing the compressed CSI feedback in each of the one or more CSI reports in any order of the SD bases, the TD bases, layers, and the subbands or the FD bases.

4. The method of claim 3, wherein determining the mapping order for placing the compressed CSI feedback comprises determining an order for placing a bitmap indicating linear combination coefficients positions according to the any order of the SD bases, the TD bases, the layers, and the subbands or the FD bases, followed by quantized linear combination coefficients associated with the SD bases, the TD bases, the layers, and the subbands or the FD bases.

5. The method of claim 1, wherein determining the mapping order comprises:
   grouping the linear combination coefficients according to a configured rule; and
   mapping the linear combination coefficients in order of group indices.

6. The method of claim 5, wherein:
   the compressed CSI feedback is further compressed in a spatial domain (SD) using SD bases, a frequency domain (FD) using subbands or FD bases, or both; and
   determining the mapping order for placing the compressed CSI feedback comprises determining the mapping order for placing, for each grouping of linear combination coefficients, a bitmap indicating coefficients positions according to any order of the SD bases, the TD bases, layers, and the subbands or the FD bases, followed by quantized linear combination coefficients associated with the SD bases, the TD bases, the layers, and the subbands or the FD bases.

7. The method of claim 1, further comprising providing an indication of the mapping order of the TD bases.

8. The method of claim 1, further comprising:
   determining an allocated uplink resource is insufficient to carry the entire CSI report of at least one of the one or more CSI reports; and
   omitting a portion of the compressed CSI feedback from at least one of the one or more CSI reports, wherein the portion of the compressed CSI feedback to omit is preconfigured, hardcoded, or fixed according a wireless standard.

9. The method of claim 8, wherein omitting the portion of the compressed CSI feedback comprises omitting the portion of the compressed CSI feedback block by block, for a plurality of blocks of the linear combination coefficients, following a priority order, until the allocated uplink resource is sufficient to carry the CSI report after the omission of the portion of the compressed CSI feedback.

10. The method of claim 9, wherein the omission starts from the block of the linear combination coefficients with a lowest priority order of the plurality of blocks of linear combination coefficients, and wherein the priority order is based on the mapping order.

11. The method of claim 9, wherein:
    the compressed CSI feedback is further compressed in a spatial domain (SD) using SD bases, a frequency domain (FD) using subbands or FD bases, or both; and
    each block of the linear combination coefficients corresponds to the linear combination coefficients associated with a group index, one of the SD bases, one of the TD bases, a layer, one of the FD bases, or a subset of the subbands.

12. The method of claim 11, wherein each block of the linear combination coefficients further corresponds to a bitmap indicating positions of the linear combination coefficients according to any order of the SD bases, the TD bases, layers, and the FD bases or the subbands.

13. The method of claim 1, further comprising:
    determining an allocated uplink resource is insufficient to carry the entire CSI report of at least one of the one or more CSI reports;
    calculating a portion of compressed CSI feedback to omit based on a total payload of the CSI feedback and maximum available payload size at the UE; and
    omitting the portion of the compressed CSI feedback from at least one of the one or more CSI reports.

14. The method of claim 13, wherein the omitting starts from a block of the linear combination coefficients with a lowest priority order of a plurality of blocks of the linear combination coefficients, and wherein the priority order is based on the mapping order.

15. The method of claim 14, wherein:
    the compressed CSI feedback is further compressed in a spatial domain (SD) using SD bases, a frequency domain (FD) using subbands or FD bases, or both; and
    each block of the linear combination coefficients corresponds to the linear combination coefficients associated with a group index, one of the SD bases, one of the TD bases, a layer, one of the FD bases, or a subset of the subbands.

16. The method of claim 1, wherein the one or more CSI-RS comprises a bundled plurality of CSI-RS transmitted at different times.

17. The method of claim 1, wherein the compressed CSI feedback includes a Doppler frequency.

18. A method for wireless communication by a base station (BS), the method comprising:
    outputting one or more channel state information reference signals (CSI-RS) to a user equipment (UE);

obtaining one or more CSI reports from the UE, the one or more CSI reports providing time domain (TD) compressed CSI feedback including at least linear combination coefficients associated with TD bases used for the TD compression;
identifying the reported CSI following an order; and
reconstructing the CSI based on the identification.

19. The method of claim 18, wherein the TD compressed CSI feedback is further spatial domain (SD) compressed using SD bases, frequency domain (FD) compressed using subbands or FD bases, or both.

20. The method of claim 19, wherein the CSI feedback in each of the one or more CSI reports is mapped to the CSI report in any order of the SD bases, the TD bases, layers, the FD bases, and the subbands or the FD bases.

21. The method of claim 20, wherein the one or more CSI reports comprise a bitmap indicating linear combination coefficients positions according to the any order of the SD bases, the TD bases, the layers, and the FD bases or the subbands, followed by quantized linear combination coefficients associated with the SD bases, the TD bases, the layers, and the FD bases or the subbands.

22. The method of claim 18, wherein:
the linear combination coefficients are grouped into groups of linear combination coefficients according to a configured rule;
each group of linear combination coefficients is associated with a group index; and
the TD compressed CSI feedback in each of the one or more CSI reports is received in order of group indices.

23. The method of claim 22, wherein:
the TD compressed CSI feedback is further spatial domain (SD) compressed using SD bases, frequency domain (FD) compressed using subbands or FD bases, or both; and
the TD compressed CSI feedback in each CSI report comprises, for each group, a bitmap indicating linear combination coefficients positions according to any order of the SD bases, the TD bases, layers, and the FD bases or the subbands, followed by quantized coefficients associated with the SD bases, the TD bases, the layers, and the FD bases or the subbands.

24. The method of claim 18, further comprising obtaining an indication from the UE of an order of the TD bases.

25. The method of claim 18, wherein:
the one or more CSI-RS comprises a bundled plurality of CSI-RS transmitted at different times; and
the TD compressed CSI feedback is based on the bundled plurality of CSI-RS.

26. The method of claim 18, further comprising:
determining the entire CSI payload size based on a first part of a CSI report of the one or more CSI reports; and
determining whether the UE omits at least a portion of the TD compressed CSI from a second part of the CSI feedback based on whether an allocated uplink resource is sufficient to carry the entire CSI report, wherein the portion of the TD compressed CSI feedback to omit is preconfigured, hardcoded, or fixed according a wireless standard.

27. The method of claim 26, further comprising determining the portion of the TD compressed CSI feedback the UE omits block by block, for a plurality of blocks of the linear combination coefficients, following a priority order, until the allocated uplink resource is sufficient to carry the CSI report after the omission of the portion of the TD compressed CSI feedback.

28. The method of claim 27, wherein the omission starts from the block of the linear combination coefficients with a lowest priority order of the plurality of blocks of the linear combination coefficients, and wherein the priority order corresponds to an order of a mapping of the plurality of blocks of the linear combination coefficients to the CSI reports.

29. The method of claim 27, wherein:
the TD compressed CSI feedback is further spatial domain (SD) compressed using SD bases, frequency domain (FD) compressed using subbands or FD bases, or both; and
each block of the linear combination coefficients corresponds to the linear combination coefficients associated with a group index, one of the SD bases, one of the TD bases, a layer, one of the FD bases, or a set of the subbands.

30. The method of claim 29, wherein each block of the linear combination coefficients further corresponds to a bitmap indicating the linear combination coefficients positions according to any order of the SD bases, the TD bases, layers, and the FD bases or the subbands.

31. The method of claim 18, further comprising:
determining whether the UE omits at least a portion of the TD compressed CSI feedback based on whether an allocated uplink resource is sufficient to carry the entire CSI report; and
determining the portion of the TD compressed CSI feedback is omitted starting from a block of the linear combination coefficients with a lowest priority order of a plurality of blocks of the linear combination coefficients, wherein the priority order corresponds to the order.

32. The method of claim 31, wherein:
the TD compressed CSI feedback is further spatial domain (SD) compressed using SD bases, frequency domain (FD) compressed using subbands or FD bases, or both; and
each block of the linear combination coefficients corresponds to the linear combination coefficients associated with a group index, one of the SD bases, one of the TD bases, a layer, one of the FD bases, or a set of the subbands.

33. An apparatus for wireless communication, the apparatus comprising:
means for receiving one or more channel state information reference signals (CSI-RS);
means for measuring the one or more CSI-RS;
means for generating compressed CSI feedback based on the measuring of the one or more CSI-RS, wherein the CSI feedback is compressed in a time domain (TD) using TD bases;
means for determining a mapping order for placing the compressed CSI feedback in one or more CSI reports; and
means for sending the one or more CSI reports providing the compressed CSI feedback including at least linear combination coefficients associated with the TD bases.

34. An apparatus for wireless communication, the apparatus comprising:
memory comprising computer executable code; and
at least one processor coupled with the memory and configured to execute the computer executable code and cause the apparatus to:
receive one or more channel state information reference signals (CSI-RS);
measure the one or more CSI-RS;

generate compressed CSI feedback based on the measuring of the one or more CSI-RS, wherein the CSI feedback is compressed in a time domain (TD) using TD bases;

determine a mapping order for placing the compressed CSI feedback in one or more CSI reports; and send the one or more CSI reports providing the compressed CSI feedback including at least linear combination coefficients associated with the TD bases.

35. An apparatus for wireless communication, the apparatus comprising:

memory comprising computer executable code; and at least one processor coupled with the memory and configured to execute the computer executable code and cause the apparatus to:

output one or more channel state information reference signals (CSI-RS) for transmission to a user equipment (UE);

obtain one or more CSI reports from the UE, the one or more CSI reports providing time domain (TD) compressed CSI feedback including at least linear combination coefficients associated with TD bases used for the TD compression;

identify the reported CSI following an order; and reconstruct the CSI based on the identification.

* * * * *